(12) United States Patent
Schaefer et al.

(10) Patent No.: US 11,472,614 B2
(45) Date of Patent: **\*Oct. 18, 2022**

(54) DISPOSABLE CUP LID

(71) Applicant: Lidworks, Co., Plant City, FL (US)

(72) Inventors: Robert Schaefer, Plant City, FL (US); Ugo Mazzarolo, Plant City, FL (US)

(73) Assignee: LIDWORKS, CO., Plant City, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/849,347

(22) Filed: Apr. 15, 2020

(65) Prior Publication Data

US 2020/0407134 A1 Dec. 31, 2020

Related U.S. Application Data

(63) Continuation-in-part of application No. 16/437,976, filed on Jun. 11, 2019, now Pat. No. 10,940,980, which is a continuation-in-part of application No. 15/712,533, filed on Sep. 22, 2017, now Pat. No. 10,351,308.

(60) Provisional application No. 62/398,256, filed on Sep. 22, 2016.

(51) Int. Cl.
*B65D 43/02* (2006.01)
*B65D 51/18* (2006.01)

(52) U.S. Cl.
CPC ......... *B65D 51/18* (2013.01); *B65D 43/0212* (2013.01); *B65D 2251/0012* (2013.01); *B65D 2251/0081* (2013.01); *B65D 2543/00027* (2013.01); *B65D 2543/00046* (2013.01); *B65D 2543/00092* (2013.01); *B65D 2543/00231* (2013.01); *B65D 2543/00296* (2013.01); *B65D 2543/00537* (2013.01)

(58) Field of Classification Search
CPC .... B65D 51/18; B65D 47/2018; B65D 47/08; B65D 47/0819; B65D 47/0838; A47G 9/22
USPC .............................................. 220/254, 254.1
See application file for complete search history.

(56) References Cited

U.S. PATENT DOCUMENTS

| 3,422,522 A | 1/1969 | Mojonnier |
| 3,705,932 A | 12/1972 | Hurst et al. |
| 4,496,408 A | 1/1985 | Hahn |
| 5,197,624 A | 3/1993 | Dodaro |

(Continued)

FOREIGN PATENT DOCUMENTS

| CH | 554161 | 9/1974 |
| DE | 1704347 | 8/1972 |

(Continued)

OTHER PUBLICATIONS

Dart Specialty Lids Product Catalog Jul. 10, 2016.
Dart Buyer's Guide Catalog Apr. 10, 2016.

*Primary Examiner* — Anthony D Stashick
*Assistant Examiner* — Raven Collins
(74) *Attorney, Agent, or Firm* — Carlton Fields, PA; William G. Giltinan

(57) ABSTRACT

A two-part disposable, stackable and recloseable lid for a container holding a beverage. The lid has a dome configuration for higher volume beverages. The lid has a drinking aperture and an a moveable arm with a plug to seal the drinking aperture. The lid has a recess for storing the plug end of the arm when the drinking aperture is being used.

8 Claims, 18 Drawing Sheets

(56) References Cited

U.S. PATENT DOCUMENTS

| | | | |
|---|---|---|---|
| 5,445,315 A | 8/1995 | Shelby | |
| 5,613,619 A | 3/1997 | Van Melle | |
| 5,685,480 A | 11/1997 | Choi | |
| 5,697,550 A | 12/1997 | Varano et al. | |
| 5,759,624 A | 6/1998 | Neale | |
| 5,810,197 A | 9/1998 | Mazzarolo | |
| 5,911,904 A | 6/1999 | Shih | |
| 6,138,902 A | 10/2000 | Welch | |
| 6,277,454 B1 | 8/2001 | Neale et al. | |
| 6,814,253 B2 | 11/2004 | Wong | |
| 6,926,197 B2 | 8/2005 | Hed et al. | |
| 6,929,143 B2 | 8/2005 | Mazzarolo | |
| 6,942,832 B2 | 9/2005 | Mazzarolo | |
| 7,074,466 B2 | 7/2006 | DeBraal et al. | |
| 7,175,800 B2 | 2/2007 | Mazzarolo | |
| 7,520,404 B2 | 4/2009 | Mazzarolo | |
| 7,676,909 B2 | 3/2010 | MacKenzie et al. | |
| 8,038,432 B2 | 10/2011 | Mazzarolo | |
| 8,113,379 B2 | 2/2012 | Cai et al. | |
| 8,631,957 B2 | 1/2014 | Dart et al. | |
| 9,452,867 B2 | 9/2016 | Koestring et al. | |
| 9,833,090 B2 | 12/2017 | Ross | |
| 2003/0024930 A1 | 2/2003 | Smith | |
| 2003/0089714 A1* | 5/2003 | Dart | B65D 47/089 220/254.3 |
| 2004/0011801 A1 | 1/2004 | Rodrigquez | |
| 2006/0144915 A1 | 7/2006 | Sadlier | |
| 2006/0196923 A1 | 9/2006 | Tedford | |
| 2006/0255043 A1* | 11/2006 | Tedford, Jr. | B65D 43/0212 220/375 |
| 2007/0034629 A1 | 2/2007 | Mazzarolo | |
| 2007/0039960 A1* | 2/2007 | Pawlik | B65D 51/18 220/254.7 |
| 2007/0210092 A1 | 9/2007 | Mazzarolo | |
| 2008/0023538 A1 | 1/2008 | Robertson et al. | |
| 2008/0121681 A1 | 5/2008 | Wiedmeyer | |
| 2008/0280742 A1 | 11/2008 | Cerasani | |
| 2009/0266828 A1 | 10/2009 | Cai | |
| 2012/0024871 A1 | 2/2012 | Hundley | |
| 2013/0146593 A1 | 6/2013 | Forsyth | |
| 2013/0277380 A1* | 10/2013 | Koestring | B65D 43/02 220/713 |

FOREIGN PATENT DOCUMENTS

| | | |
|---|---|---|
| EP | 0684122 | 11/1995 |
| FR | 1570016 | 6/1969 |
| FR | 2613982 | 10/1988 |
| FR | 2736620 | 1/1997 |

* cited by examiner

DISPOSABLE CUP LID

This application is a continuation in part of U.S. Ser. No. 16/437,976, filed on Jun. 11, 2019, which is a continuation in part of U.S. Ser. No. 15/712,533 filed on Sep. 22, 2017, now U.S. Pat. No. 10,351,308 issued on Jul. 16, 2019, which claims priority to provisional application Ser. No. 62/398,256 filed Sep. 22, 2016, all of which are herein incorporated by reference in their entirety.

This application includes material which is subject to copyright protection. The copyright owner has no objection to the facsimile reproduction by anyone of the patent disclosure, as it appears in the Patent and Trademark Office files or records, but otherwise reserves all copyrights whatsoever.

BACKGROUND

Lids for containers, such as cups, are well known in the beverage container industry. Cup lids, both disposable and reusable, with spill inhibiting features are also well known. One aspect of spill inhibiting lids, is a mechanism, such as a closure, allowing the lid to be reclosed after it has been opened, reducing the likelihood of spillage. However, the conventional manufacturing methods of disposable and reusable lids create tradeoffs in cost and performance.

The reusable variety of recloseable lids are typically more expensive to manufacturer in that the closing mechanism are capable of being manufactured out of stronger material, which allows for stronger and more precise closure configurations. A reusable recloseable lid may be formed by manufacturing two separate parts, which are then assembled to complete the closure mechanism. The use of two parts can allow for stronger manufacture of each part, and can further allow for a sophisticated reclosing mechanism. Reusable lids are typically made of thicker and more expensive material than disposable lids. This is due to the typical use of injection molding or similar as the manufacturing process. Further, reusable recloseable lids may have rubber or other parts added to enhance sealing to further prevent spillage. However, these factors lead to a lid that is expensive to manufacture, and therefore not suited for use as a disposal lid.

Disposable lids are less expensive to manufacturer due to the efficiencies typical of the thermoplastic manufacturing process used for disposable lids. Thermoplastic lids are thin and less durable compared to reusable injection molded lids. Thermoplastic lids such as this are easily mass produced and provide a cheap, stackable lid for a single use modality in the beverage industry. However, due to the thinner plastic and the thermoplastic manufacturing process, sophisticated closure methods are difficult to form in a thermoplastic lid. Due to this, existing thermoplastic disposable lids are typically formed as one-part lids with the recloseable feature fabricated connected to, or as part of the main body of the lid, in a single-part manufacturing process.

Existing reclosing features on disposable lids are typically limited by the one step thermoplastic process to be attached to the main body of the lid or require concentric pieces for ease of placement during assembly. Such reclosing features also necessarily have to bend or flex at some point when transitioning between positions. This bending or flexing of the thermoplastic naturally opposes the formed shape of the features, creating resistance that prevents the reclosing features from reliably remaining in place over the span of use.

The present invention relates to a thermoformed, two-part, stackable, recloseable, disposable, lid for a container, such as a cup. In one aspect, a pivoting arm is fabricated separate from the main body of the lid, and then assembled in an off center configuration onto the main body of the lid. The two-part configuration allows the closure mechanism to move in a rotating motion without opposing the natural structural properties of the thermoformed plastic. Another aspect is that the two-part configuration allows for a more precise and reliable closure which is more typical of a reusable lid.

In certain embodiments, a dome configuration allows for an increase in the volume beyond that of the cup for hot or cold beverages. A further aspect of embodiments of the invention is the stackable nature of the lids. The pivoting arm is formed and assembled to the body of the lid in a manner so that the pivoting arm does not inhibit stacking.

SUMMARY

The lid boundary is defined by a skirt region. Adjacent on the interior of the skirt may be a channel. The channel receives and captures the top rim of a container, such as a cup. A valley region may optionally be positioned on the inside of the channel. Other embodiments may omit a channel, using only an outer edge to capture and secure the lid to the cup rim.

The interior of the lid is defined by a lower central platform which has a plane having substantial portions level with, or above, the plane of the channel ceiling. The boundary of the lower central platform is defined by an upwardly extending inner wall to an upper surface, which is a raised portion. The upper surface is bounded exteriorly by a downwardly extending outer wall. Between the inner wall and outer wall is a ceiling, the top side of which is the upper surface. The outer wall may define the inside of the valley region, with the inside wall of the channel defining the outer boundary of the valley region. Alternatively, the outer wall may come into direct contact with the channel, with no valley region present. A vent hole may optionally be positioned on the lower central platform.

The upper surface has an opening for drinking at the front of the lid, and a catching recess or restraining plug positioned at an angle from the drinking opening, creating a two position system for a pivoting or folding arm. On one end of the arm a plug is positioned for plugging the drinking opening when in a first position and catching in the catching recess or restraining plug in a second position. The other end of the arm is attached to the lid.

The arm attaches to the lid portion on the upper surface. The attachment may include a post positioned on the upper surface and a corresponding hole or recess in the non-plug end of the arm to accept the end of the post. Alternatively, the attachment may comprise a post positioned in the non-plug end of the arm and a corresponding recess or hole in the upper surface. Where pivoting is desired, the post may be rounded and adapted to snap into the corresponding hole or recess to discourage the arm from lifting off. Where folding is desired, the post may be any shape, and may optionally snap into the corresponding hole or recess to discourage the arm from lifting off, or coining may be used to join the post and recess and discourage the arm from lifting off. When pivoting is desired, a restraining recess on the upper surface may retain the plug when the arm is in a pivoted position. When folding is desired, a restraining plug may be used to engage the plug on the arm when the arm is in a folded position.

BRIEF DESCRIPTION OF THE DRAWINGS

Other features in the invention will become apparent from the attached drawings, which illustrate certain preferred embodiments of the apparatus of this invention, wherein.

DESCRIPTION OF EMBODIMENTS

Figure 1A:
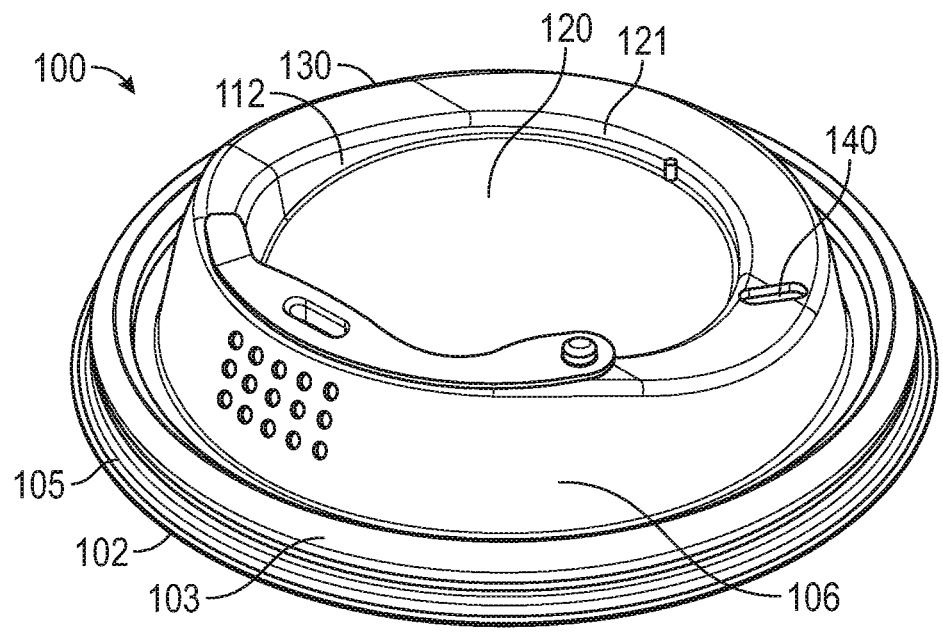
FIG. 1A is a perspective view of a preferred embodiment of a two part, recloseable, stackable and disposable lid according to the present invention having an arm with a mounting hole, a tab on the arm for grasping, and a channel for attachment to a cup showing the arm in a closed position.

While the following describes preferred embodiments of this invention, it is understood that this description is to be considered only as illustrative of the principles of the invention and is not to be limitative thereof, as numerous other variations, all within the scope of the invention, will occur to those of ordinary skill in the art.

It will be noted that in the illustrated embodiments, different embodiments comprise the same or similar components. Where components in different embodiments have a similar structure, but are not necessarily common parts, the components have element numbers with different first digits, but common second and third digits. For example, and without limitation, references 160, 260, 360, 460, 560, 660, 860, 960, and 1060 share attributes of a common arm structure, but may not be strictly identical parts. Where the same element numbers are used, the drawing illustrates uses of multiple copies of essentially the same component or feature.

Herein, the following terms shall have the following meanings:

The term "adapted" means sized, shaped, configured, dimensioned, oriented and arranged as appropriate.

The definitions and meanings of other terms herein shall be apparent from the following description, the figures, and the context in which the terms are used.

Referring now to FIG. 1, a two-part recloseable lid 100 is shown. In an exemplary embodiment, the first part, the recloseable lid 100, is manufactured with thin flexible plastic by conventional thermoforming. The recloseable lid 100 is adapted for mounting and attaching to a container (not shown), such as a disposable cup. As illustrated by FIG. 1A, an outer edge 102 is bounded interiorly by a channel 103 for mounting to a container. The outer edge 102 comprises a skirt 105 positioned outside of the channel 103. The channel 103 is defined by interior and exterior walls with a ceiling.

The channel 103 is adapted to receive and retain a rim of a container, such as a cup. The channel 103 grips the rim of the container, holding it in place, creating a seal which resists the spillage of the container contents.

Figure 1B:
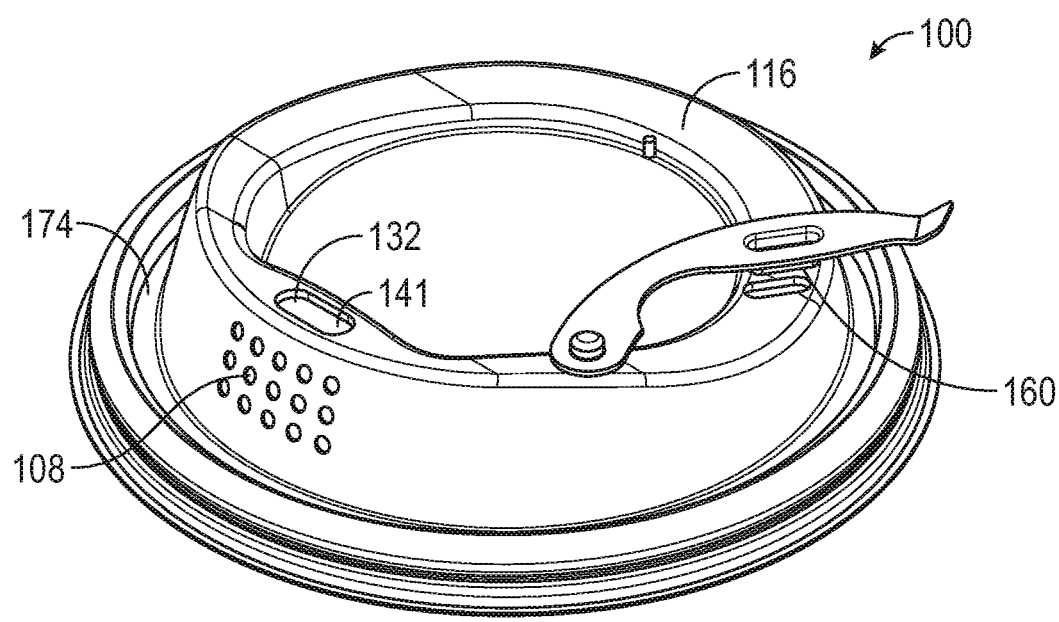
FIG. 1B is a perspective view of the embodiment of FIG. 1A showing the arm in an open position.

Recloseable lid 100 is further comprised of an upwardly extending outer wall 106 opposite an inner wall 112 with a upper surface 130 spaced between and extending from the top of each wall. As illustrated, the top plane of the upper surface 130 has a generally symmetrical gradual incline on both sides from the low point on a lower plane 116 at the rear of the lid and a higher plane 118 at the front of the lid, as shown at FIG. 1B. As illustrated, the higher plane 118 is the high point of the upper surface 130. In some embodiments, a lower valley 174 may be positioned between the channel 103 and the outer wall 106. In other embodiments the lower valley may be omitted, where the inside of the channel 103 is adjacent to the outer wall 106 or outer wall 106 extends upwardly from a point level with or higher than the channel 103.

At the front of the recloseable lid 100 in the upper surface 130 is a drink opening 132 extending upwardly through the upper surface 130. In a preferred embodiment, the drink opening 132 may be an elongated oval shape. The drinking opening 132 sits inside a front plug recess 141 and provides an aperture from which liquid can flow through. The front plug recess 141 is a cavity adapted to accept a plug 165, which is illustrated at FIG. 1E. The front plug recess 141 is formed to substantially match the shape of the plug 165. The shape of the front plug recess 141 is adapted so that the mating with the plug 165, illustrated in FIG. 1A, is such that the interface between the plug 165 and front plug recess 141 discourages the leaking or passing of liquid. A cross section of the front plug recess is illustrated at FIG. 1F. The floor of the front plug recess 141 provides an area where the drinking opening 132 may be positioned.

The drinking opening 132 may be created by a punch. A method of punching openings in thermoplastic may lack precision in a mass producing manufacturing process. The front plug recess 141 provides a margin of error for the punch to create the drinking opening 132. This allows for the plug 165 to fit into the front plug recess 141 providing the leak discouraging properties even when the punching of the drinking opening may not be centered in the front plug recess 141, or consistent with the punch location.

However, in some embodiments, it may be preferable to use only a drink opening made via punch or similar means. This may provide a more convenient manufacturing process my eliminating the need to form a front plug recess.

At the front of the recloseable lid 100, on the outer face of the outer wall 106, centered on the drink opening 132, are recesses 108, shown at FIG. 1B. In some embodiments, the recesses 108 may instead be protrusions. In a preferred embodiment the recesses 108 or protrusions are circular in shape. The recesses 108 provide texture that a user, by the feel of the recesses 108, may position the recloseable lid 100 as it is attached to a container so that drink opening 132 is in front for drinking, centered for the users mouth. The recesses 108 may result in an increased surface area in the generally front facing portion of the outer wall. The increased surface area may provide a cooling effect on a beverage as it passes over the recesses 108. In an alternate embodiment, the recesses 108 may act to further insulate the user's mouth from a hot beverage inside the cup.

Figure 1C:
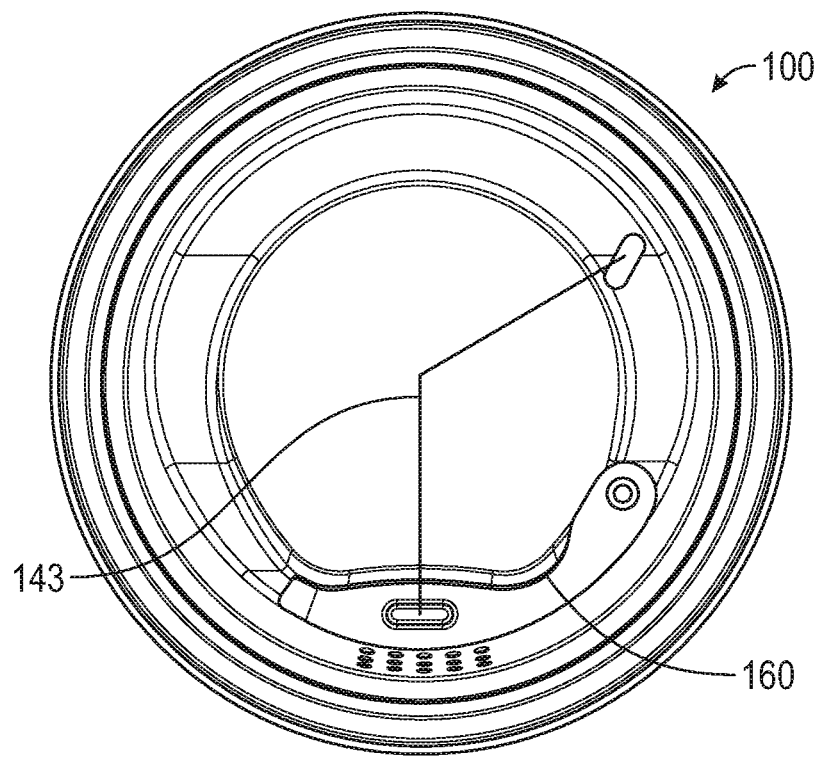
FIG. 1C is a top view of the embodiment of FIG. 1A showing the arm in a closed position.
Figure 1D:
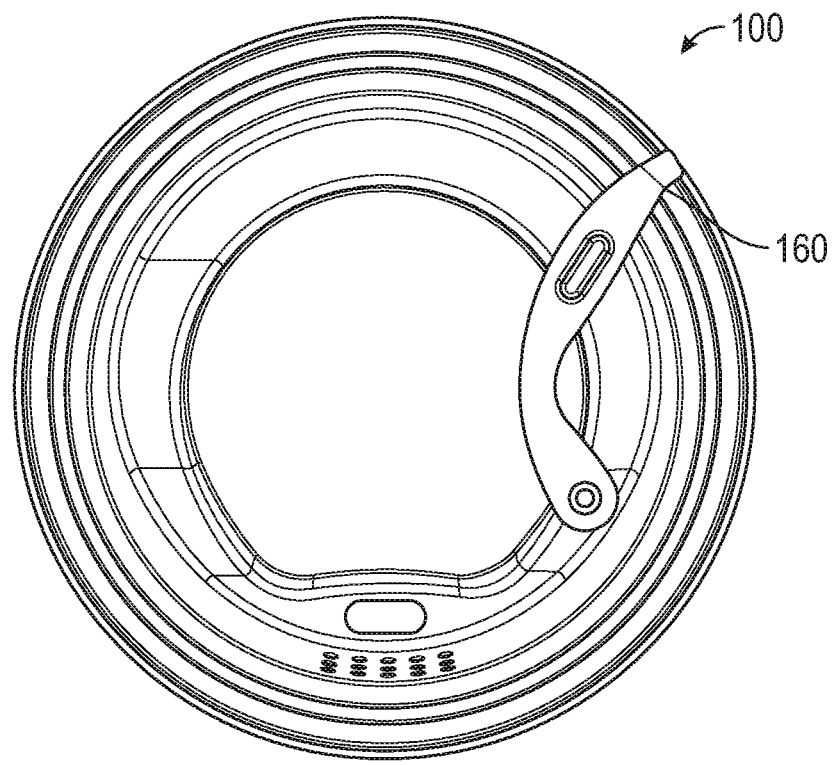
FIG. 1D is a top view of the embodiment of FIG. 1A showing the arm in an open position.
Figure 1E:
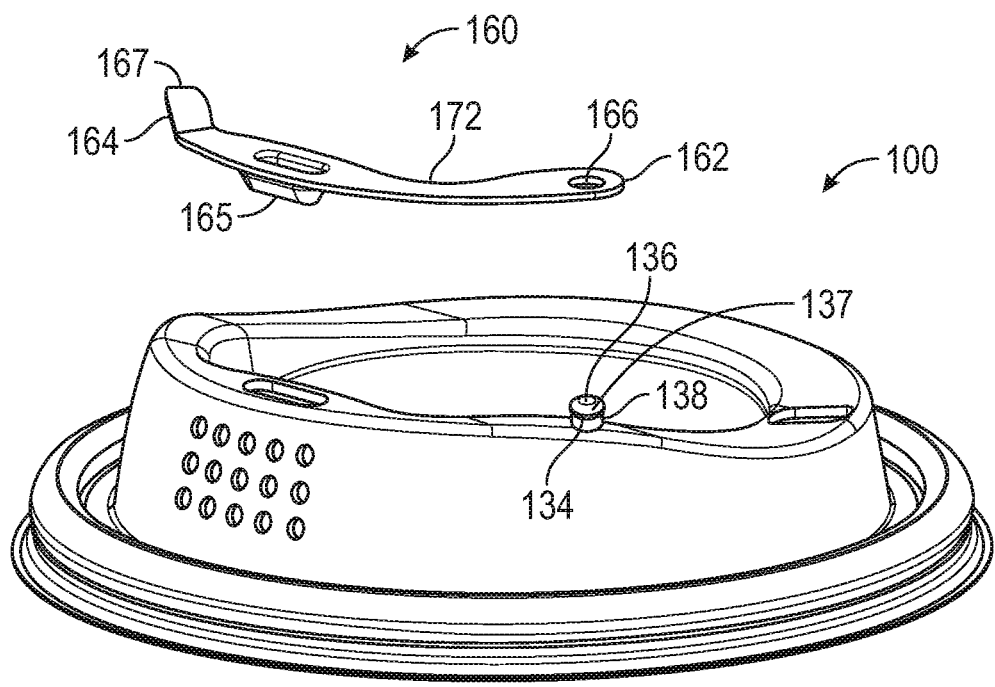
FIG. 1E is an exploded, perspective view of the embodiment of FIG. 1A showing the arm and lid separated.
Figure 1F:
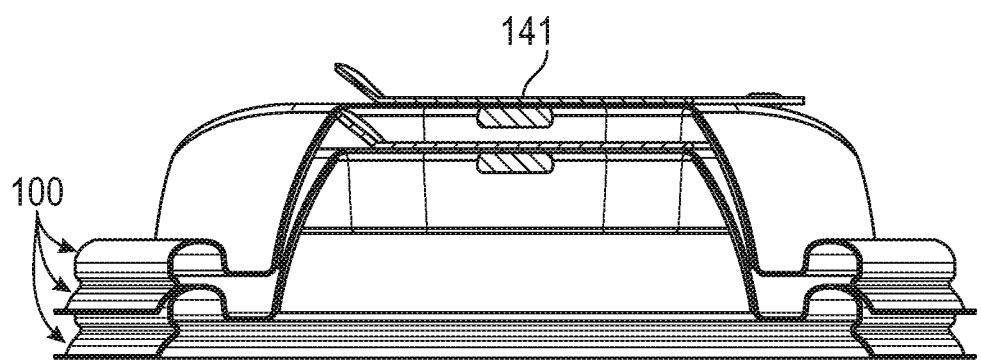
FIG. 1F is a cutaway side view of the embodiment of FIG. 1A when stacked.

A plug recess 140 is positioned on and within the upper surface 132 at an angle α 143, illustrated at FIG. 1C, from the drink opening 132. In a preferred embodiment, the angle between the drink opening 130 and the plug 165 recess 140 is between 60 degrees and 170 degrees. The plug 165 recess 140 is a cavity with a floor adapted to accept and retain a plug 165. At the midpoint between the drink opening 132 and the plug recess 140, a post 134, illustrated at FIG. 1E, rises from the upper surface 130, substantially vertically. The post 134 comprises a post shaft terminating in a beveled post upper end 136. The post upper end 136 comprises a ridge 138 positioned around the exterior of the post 134 below the post end bevel 137. The post end ridge 138 is adapted to accept a mounting hole 166 in the arm 160 that passes down over the bevel 137 and ridge 138. The post 134 is further illustrated in a cross-sectional view at FIGS. 2B and 2C.

The characteristics of the thermoplastic are such that the mounting hole 166 and ridge 138 will flex and expand such that the mounting hole 166 can pass down over the bevel 137 and ridge 138. The ridge 138 then acts as a stop to discourage the mounting hole 166 from passing back over the ridge 138, where there is no bevel to assist from the bottom of the ridge 138. In a preferred embodiment, the post may have a narrow region just below the post ridge 138 for the edge of the mounting hole 166 to rest in. In this embodiment the gradient of the post diameter, where the narrow region begins, would act as a stop preventing the mounting hole from sliding down the post.

Interior to the inner wall 112 is a lower central platform 120, illustrated at FIG. 1A. The lower central platform 120 may be a substantially flat plane positioned on the interior of the lid and bounded by the inner wall 112. As illustrated, the elevation of the lower central platform 120 is between the top of the channel 103 and the highest point on the upper surface 130. A vent hole 121 passes through the lower central platform 120 and allows steam to escape and alternatively, allows liquid to drain into the cup that may have accumulated on the lower central platform 120 as the liquid passes through the drinking opening 132. In a preferred embodiment, the vent hole 121 may be adjacent to and in contact with the inner wall 112, where a portion of vent hole 121 travels vertically along the inner wall 112.

The second part of the two-part recloseable lid 100 comprises an arm 160, illustrated at FIG. 1E. In a preferred embodiment, the arm 160 comprises a thin piece of thermoformed plastic with an outer arm edge 170 and an inner arm edge 172, and terminates in an arm mounting end 162 and an arm plug end 164. In an alternate embodiment, the arm plug end terminates in a tab 167. The tab 167 may be inclined from the plane of the arm 160 to aid the user in grasping the arm.

As illustrated, the arm mounting end comprises a mounting hole 166 adapted to be retained by the post upper end 136 and ridge 138. The arm plug end 164 comprises a plug 165 adapted to be received and retained by the plug recess 140 and the drink opening 132. The arm 160, when mounted pivotally to the post 134, creates a two position configuration, with the first arm position describing a position of the arm where the arm plug end 164 is mated with and plugging the drink opening 132. The second arm position describes a position of the arm where the arm plug end 164 is mated with and secured in the plug recess 140.

Figure 2A:
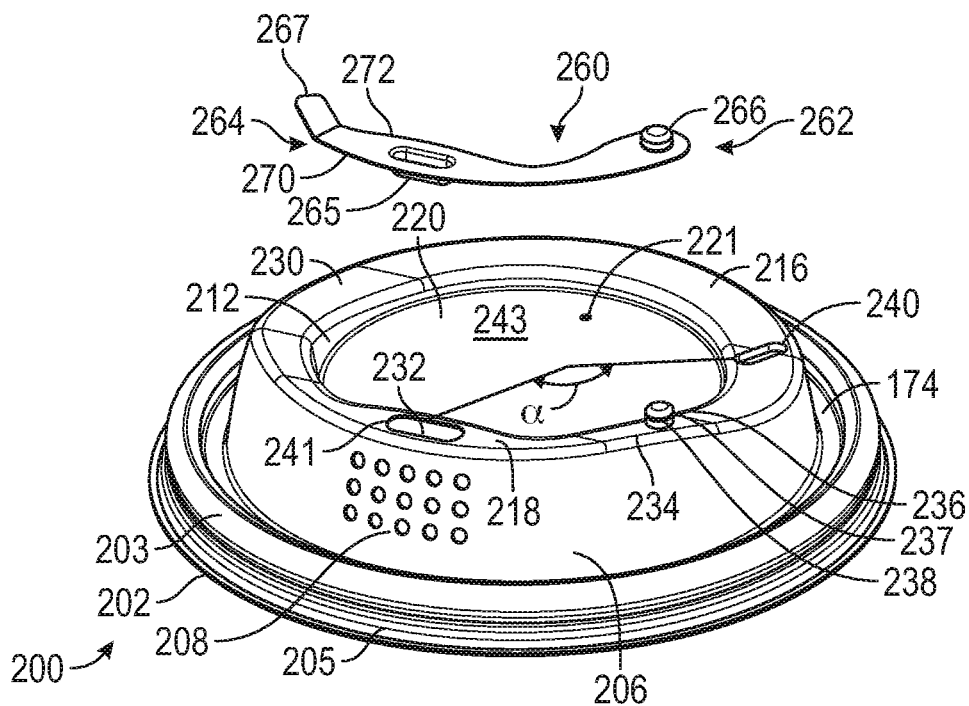
FIG. 2A is an exploded, perspective view of an alternate embodiment of a two part, recloseable, stackable and disposable lid according to the present invention having an arm with a mounting recess, a tab on the arm for grasping, and a channel for attachment to a cup.

Referring now to FIG. 2, a two-part recloseable lid 200 is shown. In an exemplary embodiment, the first part, the recloseable lid 200, is manufactured with thin flexible plastic by conventional thermoforming. The recloseable lid 200 is adapted for mounting and attaching to a container (not shown), such as a disposable cup. As illustrated by FIG. 2A, an outer edge 202 is bounded interiorly by a channel 203 for mounting to a container. The outer edge 202 comprises a skirt 205 positioned outside of the channel 203. The channel 203 is defined by interior and exterior walls with a ceiling. The channel 203 is adapted to receive and retain a rim of a container, such as a cup. The channel 203 grips the rim of the container, holding it in place, creating a seal which resists the spillage of the container contents.

Recloseable lid 200 is further comprised of an upwardly extending outer wall 206 opposite an inner wall 212 with an upper surface 230 spaced between and extending from the top of each wall. As illustrated, the top plane of the upper surface 230 has a generally symmetrical gradual incline on both sides from the low point on a lower plane 216 at the rear of the lid and a higher plane 218 at the front of the lid. As illustrated, the higher plane 218 is the high point of the upper surface 230. In some embodiments, a lower valley 174 may be positioned between the channel 203 and the outer wall 206. In other embodiments the lower valley may be omitted, where the inside of the channel 203 is adjacent to the outer wall 206 or outer wall 206 extends upwardly from a point level with or higher than the channel 203.

At the front of the recloseable lid 200 in the upper surface 230 is a drink opening 232 extending upwardly through the upper surface 230. In a preferred embodiment, the drink opening 232 may be an elongated oval shape. The drinking opening 232 sits inside a front plug recess 241 and provides an aperture from which liquid can flow through. The front plug recess 241 is a cavity adapted to accept a plug 265, similar to that illustrated at FIG. 1E. The front plug recess 241 is formed to substantially match the shape of the plug 265. The shape of the front plug recess 241 is adapted so that the mating with the plug 265 is such that the interface between the plug 265 and front plug recess 241 discourages the leaking or passing of liquid. The floor of the front plug recess 241 provides an area where the drinking opening 232 may be positioned.

The drinking opening 232 may be created by a punch. A method of punching openings in thermoplastic may lack precision in a mass producing manufacturing process. The front plug recess 241 provides a margin of error for the punch to create the drinking opening 232. This allows for the plug 265 to fit into the front plug recess 241 providing the leak discouraging properties even when the punching of the drinking opening may not be centered in the front plug recess 241, or consistent with the punch location.

At the front of the recloseable lid 200, on the outer face of the outer wall 206, centered on the drink opening 232, are recesses 208, shown at FIG. 2A. In some embodiments, the recesses 208 may instead be protrusions. In a preferred embodiment the recesses 208 or protrusions are circular in shape. The recesses 208 provide texture that a user, by the feel of the recesses 208, may position the recloseable lid 200 as it is attached to a container so that drink opening 232 is in front for drinking, centered for the users mouth. The recesses 208 may result in an increased surface area in the generally front facing portion of the outer wall. The increased surface area may provide a cooling effect on a beverage as it passes over the recesses 208. In an alternate embodiment, the recesses 208 may act to further insulate the user's mouth from a hot beverage inside the cup.

A plug recess 240 is positioned on and within the upper surface 232 at an angle α 243 from the drink opening 232. In a preferred embodiment, the angle between the drink opening 230 and the plug 265 recess 240 is between 60 degrees and 170 degrees. The plug 265 recess 240 is a cavity with a floor adapted to accept and retain a plug 265. At the midpoint between the drink opening 232 and the plug recess 240, a post 234, illustrated at FIG. 2A, rises from the upper surface 230, substantially vertically. The post 234 comprises a post shaft terminating in a beveled post upper end 236. The post upper end 236 comprises a ridge 238 positioned around the exterior of the post 234 below the post end bevel 237. The post end ridge 238 is adapted to fit into and be retained by a mounting recess 266. The mounting recess 266 is comprised of a cap, wider upper portion 247 and narrow lower portion 248 adapted to capture the post upper end 236. The post 234 and mounting recess 266 are further illustrated in a cross-sectional view at FIGS. 2B and 2C.

The characteristics of the thermoplastic are such that the mounting recess 266 and ridge 238 will flex and expand such that the mounting recess 266 can pass down over the bevel 237 and ridge 238. The ridge 238 then acts to discourage the mounting recess 266 from passing back over the ridge 238, where there is no bevel to assist from the bottom of the ridge 238. In a preferred embodiment, the post 234 may have a narrow region just below the post ridge 238 for the lower narrow portion 248 of the mounting recess 266 to fit with.

Interior to the inner wall 212 is a lower central platform 220, illustrated at FIG. 2A. The lower central platform 220 may be a substantially flat plane positioned on the interior of the lid and bounded by the inner wall 212. As illustrated, the elevation of the lower central platform 220 is between the top of the channel 203 and the highest point on the upper surface 230. A vent hole 221 passes through the lower central platform 220 and allows steam to escape and alternatively, allows liquid to drain into the cup that may have accumulated on the lower central platform 220 as the liquid passes through the drinking opening 232. In a an alternate embodiment, the vent hole 221 may be adjacent to and in contact with the inner wall 212, where a portion of vent hole 221 travels vertically along the inner wall 212.

The second part of the two-part recloseable lid 200 comprises an arm 260, illustrated at FIG. 2A. In a preferred embodiment, the arm 260 comprises a thin piece of thermoformed plastic with an outer arm edge 270 and an inner arm edge 272, and terminates in an arm mounting end 262 and an arm plug end 264. In an alternate embodiment, the arm plug end terminates in a tab 267. The tab 267 may be inclined from the plane of the arm 260 to aid the user in grasping the arm.

The arm mounting end 262 comprises a mounting recess 266 adapted to retain the post upper end 236 and ridge 238. The mounting recess 266 comprises a cap that may protrude from the plane of the arm 260. The cap comprises a wider upper portion 247 adapted to receive the post upper end 236. More specifically, the wider upper portion 247 may be adapted to accept the ridge 238, where the inner diameter of the wider upper portion 247 is substantially similar, to the outer diameter of the ridge 238. If the diameters of the wider upper portion 247 and the ridge 238 are not substantially similar, the mounting recess 266 will fit loosely on the post upper end 236. If the outer diameter of the ridge 238 is larger than the inner diameter of the wider upper portion 247, then the mounting recess 266 may not fit down over the post upper end 236.

The inner diameter of the lower narrow portion 248 may be slightly less than the outer diameter of the ridge 238 so that the lower narrow portion 248 may expand slightly to allow the ridge 238 to pass through the lower narrow portion 248, assisted by the incline plane of the bevel 237, then retract back to the original diameter, which is less than the outer diameter of the ridge 238. The lower narrow portion 248 would then retain the ridge 238 above it. The lack of a bevel on the bottom side of the ridge reduces the ability of the ridge 238 to cause the lower narrow portion 248 to expand, thereby keeping the ridge 238, and the post upper end 236 within the mounting recess 266.

The arm plug end 264 comprises a plug 265 adapted to be received and retained by the plug recess 240 and the front plug recess 241. The arm 260, when mounted pivotally to the post 234, creates a two position configuration, with the first arm position describing a position of the arm where the arm plug end 264 is mated with and plugging the drink opening 232. The second arm position describes a position of the arm where the arm plug end 264 is mated with and secured in the plug recess 240.

Figure 3B:
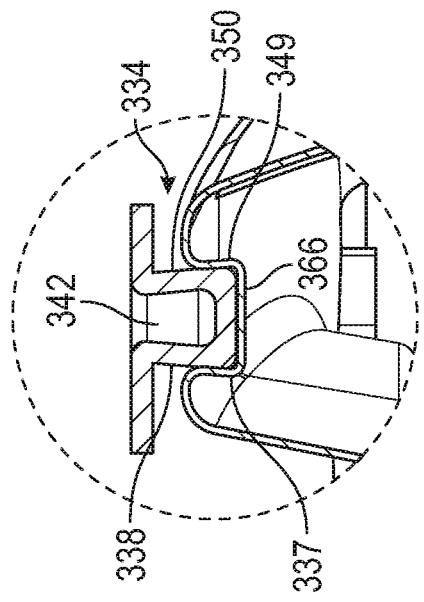
FIG. 3B is a detail view of the indicated portion of FIG. 3C showing the arm attachment structure.
Figure 3A:
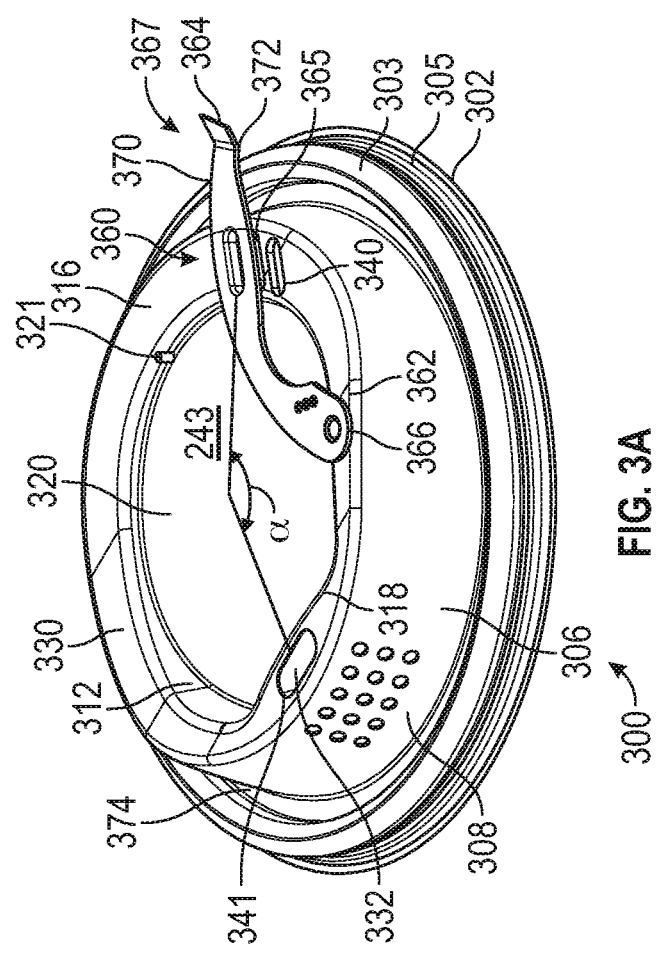
FIG. 3A is a perspective view of a preferred embodiment of a two part, recloseable, stackable and disposable lid according to the present invention having an arm mounted with a mounting post, a tab on the arm for grasping, and a channel for attachment to a cup.

Referring now to FIG. 3, a two-part recloseable lid 300 is shown. In an exemplary embodiment, the first part, the recloseable lid 300, is manufactured with thin flexible plastic by conventional thermoforming. The recloseable lid 300 is adapted for mounting and attaching to a container (not shown), such as a disposable cup. As illustrated by FIG. 3A, an outer edge 302 is bounded interiorly by a channel 303 for mounting to a container. The outer edge 302 comprises a skirt 305 positioned outside of the channel 303. The channel 303 is defined by interior and exterior walls with a ceiling. The channel 303 is adapted to receive and retain a rim of a container, such as a cup. The channel 303 grips the rim of the container, holding it in place, creating a seal which resists the spillage of the container contents.

Recloseable lid 300 is further comprised of an upwardly extending outer wall 306 opposite an inner wall 312 with an upper surface 330 spaced between and extending from the top of each wall. As illustrated, the top plane of the upper surface 330 has a generally symmetrical gradual incline on both sides from the low point on a lower plane 316 at the rear of the lid and a higher plane 318 at the front of the lid. As illustrated, the higher plane 318 is the high point of the upper surface 330. In some embodiments, a lower valley 374 may be positioned between the channel 303 and the outer wall 306. In other embodiments the lower valley may be omitted, where the inside of the channel 303 is adjacent to the outer wall 306 or outer wall 306 extends upwardly from a point level with or higher than the channel 303.

At the front of the recloseable lid 300 in the upper surface 330 is a drink opening 332 extending upwardly through the upper surface 330. In a preferred embodiment, the drink opening 332 may be an elongated oval shape. The drinking opening 332 sits inside a front plug recess 341 and provides an aperture from which liquid can flow through. The front plug recess 341 is a cavity adapted to accept a plug 365, which is also illustrated at FIG. 1E. The front plug recess 341 is formed to substantially match the shape of the plug 365. The shape of the front plug recess 341 is adapted so that the mating with the plug 365, is such that the interface between the plug 365 and front plug recess 341 discourages the leaking or passing of liquid. The floor of the front plug recess 341 provides an area where the drinking opening 332 may be positioned.

The drinking opening 332 may be created by a punch. A method of punching openings in thermoplastic may lack precision in a mass producing manufacturing process. The front plug recess 341 provides a margin of error for the punch to create the drinking opening 332. This allows for the plug 165 to fit into the front plug recess 141 providing the leak discouraging properties even when the punching of the drinking opening may not be centered in the front plug recess 141, or consistent with the punch location.

At the front of the recloseable lid 300, on the outer face of the outer wall 306, centered on the drink opening 332, are recesses 308, shown at FIG. 1B. In some embodiments, the recesses 308 may instead be protrusions. In a preferred embodiment the recesses 308 or protrusions are circular in shape. The recesses 308 provide texture that a user, by the feel of the recesses 308, may position the recloseable lid 300 as it is attached to a container so that drink opening 332 is in front for drinking, centered for the users mouth. The recesses 308 may result in an increased surface area in the generally front facing portion of the outer wall. The increased surface area may provide a cooling effect on a beverage as it passes over the recesses 308. In an alternate embodiment, the recesses 308 may act to further insulate the user's mouth from a hot beverage inside the cup.

A plug recess 140 is positioned on and within the upper surface 332 at an angle α 143 from the drink opening 332. In a preferred embodiment, the angle between the drink opening 330 and the plug 165 recess 140 is between 60 degrees and 170 degrees. The plug 165 recess 140 is a cavity with a floor adapted to accept and retain a plug 165. At the midpoint between the drink opening 332 and the plug recess 340, a post mounting recess 366 extends downward into the upper surface 330. The post mounting recess 366 is a generally circular cavity with a floor. The post mounting recess 366 is comprised of a wider lower portion 249 and a narrow upper portion 250, adapted to accept and retain a post lower end 342.

Interior to the inner wall 312 is a lower central platform 320, illustrated at FIG. 3A. The lower central platform 320 may be a substantially flat plane positioned on the interior of the lid and bounded by the inner wall 312. As illustrated, the elevation of the lower central platform 320 is between the top of the channel 303 and the highest point on the upper surface 330. A vent hole 321 passes through the lower central platform 320 and allows steam to escape and alternatively, allows liquid to drain into the cup that may have accumulated on the lower central platform 320 as the liquid passes through the drinking opening 332. In a preferred embodiment, the vent hole 321 may be adjacent to and in contact with the inner wall 312, where a portion of vent hole 321 travels vertically along the inner wall 312.

The second part of the two-part recloseable lid 300 comprises an arm 360. In a preferred embodiment, the arm 360 comprises a thin piece of thermoformed plastic with an outer arm edge 370 and an inner arm edge 372, and terminates in an arm mounting end 362 and an arm plug end 364. In an alternate embodiment, the arm plug end terminates in a tab 367. The tab 367 may be inclined from the plane of the arm 360 to aid the user in grasping the arm.

Figure 3C:
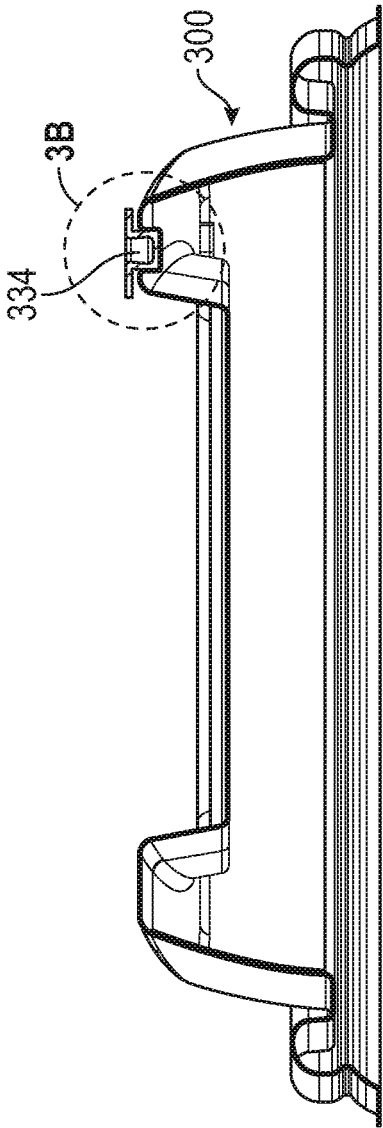
FIG. 3C is a side, cutaway view of the embodiment of FIG. 3A.

The arm mounting end 362 comprises a downward positioned post 334 with a post lower end 342, illustrated at FIGS. 3B and 3C. The post lower end 342 comprises a bevel 337 and a ridge 338. The post comprises a downward facing post shaft terminating in a beveled post lower end 342. The post lower end 342 comprises a ridge 338 positioned around the exterior of the post above the post end bevel 337. The post lower end 342 is adapted to be accepted and retained by the mounting recess 366.

The mounting recess 366 comprises a cavity on and within the plane of the upper surface 330. The mounting recess 366 comprises a narrow upper portion 350 and a wider lower portion 349 adapted to receive the post lower end 342. More specifically, the narrow upper portion 350 may be adapted to accept the ridge 338, where the inner diameter of the wider lower portion 349 is substantially similar, to the outer diameter of the ridge 338. If the diameters of the wider lower portion 349 and the ridge 338 are not substantially similar, the mounting recess 366 will fit loosely around the post lower end 342. If the outer diameter of the ridge 338 is larger than the inner diameter of the wider lower portion 349, then the post lower end 342 may not fit down into the mounting recess 366.

The inner diameter of the lower wider portion 350 may be slightly less than the outer diameter of the ridge 338 so that the narrow lower portion 348 may expand slightly to allow the ridge 338 to pass through the narrow upper portion 350, assisted by the incline plane of the bevel 337, then retract back to the original diameter, which is less than the outer diameter of the ridge 338. The narrow upper portion 350 would then retain the ridge 338 below it. The lack of a bevel on the bottom side of the ridge reduces the ability of the ridge 338 to cause narrow upper portion 350 to expand, thereby keeping the ridge 338, and the post lower end 342 within the mounting recess 366.

The arm plug end 364 comprises a plug 365 adapted to be received and retained by the plug recess 340 and the front plug recess 341. The arm 360, when mounted pivotally to the post 334, creates a two position configuration, with the first arm position describing a position of the arm where the arm plug end 364 is mated with and plugging the drink opening 332. The second arm position describes a position of the arm where the arm plug end 364 is mated with and secured in the plug recess 340.

The characteristics of the thermoplastic are such that the post mounting recess 366 and ridge 338 will flex and expand such that the post lower end 342 can insert down into the post mounting recess 366, past the narrow upper portion 350. The wider lower portion 349 of the post mounting recess 366 accepts the ridge 338. The narrow upper portion then acts as a stop to retain the post lower end 342 in the post mounting recess 366.

Figure 4A:
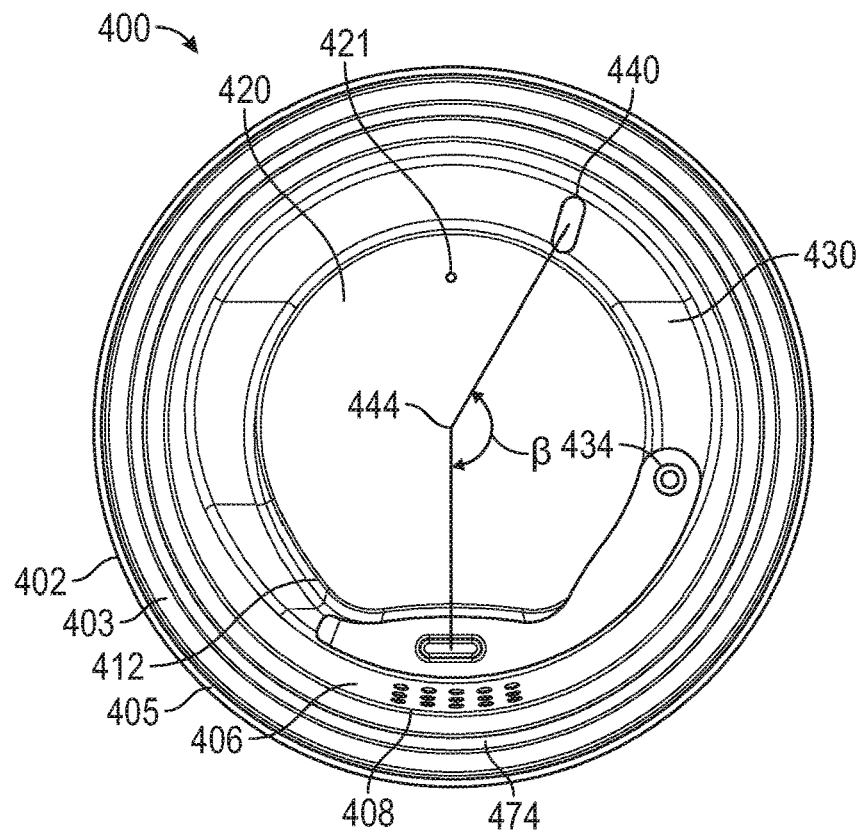
FIG. 4A is a perspective view of a preferred embodiment of a two part, recloseable, stackable and disposable lid according to the present invention having a large arm with a mounting recess, a tab on the arm for grasping, and a channel for attachment to a cup with the arm in a closed position
Figure 4B:
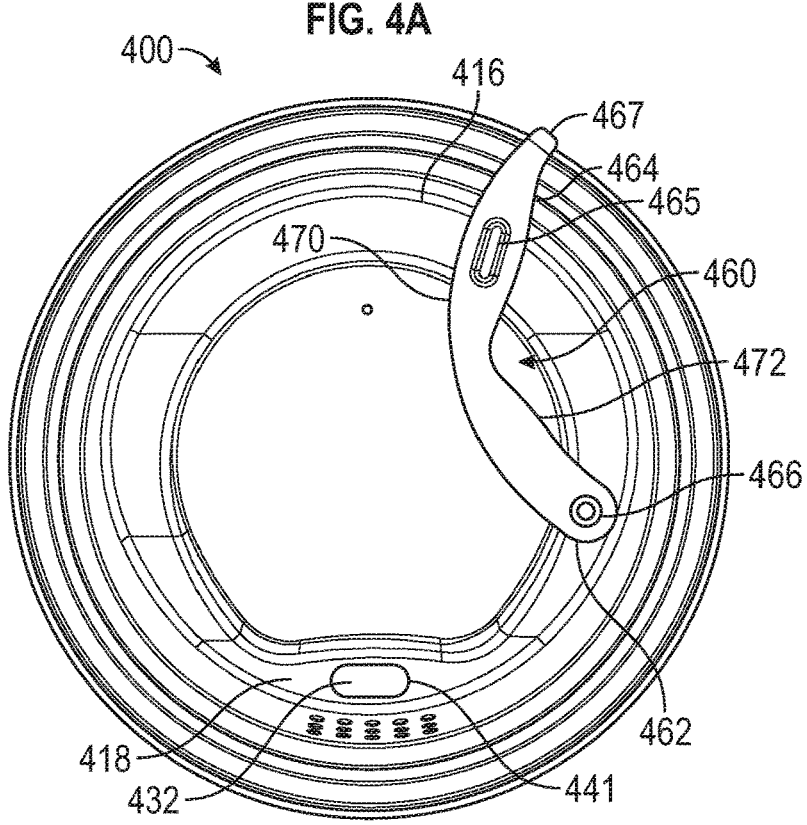
FIG. 4B is a top view of the embodiment of FIG. 4A with the arm in an open position.

Referring now to FIG. 4, a two-part recloseable lid 400 is shown. In an exemplary embodiment, the first part, the recloseable lid 400, is manufactured with thin flexible plastic by conventional thermoforming. The recloseable lid 400 is adapted for mounting and attaching to a container (not shown), such as a disposable cup. As illustrated by FIG. 4A, an outer edge 402 is bounded interiorly by a channel 403 for mounting to a container. The outer edge 402 comprises a skirt 405 positioned outside of the channel 403. The channel 403 is defined by interior and exterior walls with a ceiling. The channel 403 is adapted to receive and retain a rim of a container, such as a cup. The channel 403 grips the rim of the container, holding it in place, creating a seal which resists the spillage of the container contents.

Recloseable lid 400 is further comprised of an upwardly extending outer wall 406 opposite an inner wall 412 with an upper surface 430 spaced between and extending from the top of each wall. As illustrated, the top plane of the upper surface 430 has a generally symmetrical gradual incline on both sides from the low point on a lower plane 416 at the rear of the lid and a higher plane 418 at the front of the lid. As illustrated, the higher plane 418 is the high point of the upper surface 430. In some embodiments, a lower valley 474 may be positioned between the channel 403 and the outer wall 406. In other embodiments the lower valley may be omitted, where the inside of the channel 403 is adjacent to the outer wall 406 or outer wall 406 extends upwardly from a point level with or higher than the channel 403.

At the front of the recloseable lid 400 in the upper surface 430 is a drink opening 432 extending upwardly through the upper surface 430. In a preferred embodiment, the drink opening 432 may be an elongated oval shape. The drinking opening 432 sits inside a front plug recess 441 and provides an aperture from which liquid can flow through. The front plug recess 441 is a cavity adapted to accept a plug 465, similar to that illustrated at FIG. 1E. The front plug recess 441 is formed to substantially match the shape of the plug 465. The shape of the front plug recess 441 is adapted so that the mating with the plug 465 is such that the interface between the plug 465 and front plug recess 441 discourages the leaking or passing of liquid. The floor of the front plug recess 441 provides an area where the drinking opening 432 may be positioned.

The drinking opening 432 may be created by a punch. A method of punching openings in thermoplastic may lack precision in a mass producing manufacturing process. The front plug recess 441 provides a margin of error for the punch to create the drinking opening 432. This allows for the plug 465 to fit into the front plug recess 441 providing the leak discouraging properties even when the punching of the drinking opening may not be centered in the front plug recess 441, or consistent with the punch location.

At the front of the recloseable lid 400, on the outer face of the outer wall 406, centered on the drink opening 432, are recesses 408. In some embodiments, the recesses 408 may instead be protrusions. In a preferred embodiment the recesses 408 or protrusions are circular in shape. The recesses 408 provide texture that a user, by the feel of the recesses 408, may position the recloseable lid 400 as it is attached to a container so that drink opening 432 is in front for drinking, centered for the users mouth. The recesses 408 may result in an increased surface area in the generally front facing portion of the outer wall. The increased surface area may provide a cooling effect on a beverage as it passes over the recesses 408. In an alternate embodiment, the recesses 408 may act to further insulate the user's mouth from a hot beverage inside the cup.

A plug recess 440 is positioned on and within the upper surface 432 at an angle β 444 from the drink opening 432. In a preferred embodiment, the angle between the drink opening 430 and the plug 465 recess 440 is between 60 degrees and 170 degrees. The plug 465 recess 440 is a cavity with a floor adapted to accept and retain a plug 465. At the midpoint between the drink opening 432 and the plug recess 440, a post 434, rises from the upper surface 430, substantially vertically. The post 434 and sub-features are substantially similar to those illustrated in FIGS. 2C and 2B. The post 434 comprises a post shaft terminating in a beveled post upper end 436. The post upper end 436 comprises a ridge 438 positioned around the exterior of the post 434 below the post end bevel 437. The post end ridge 438 is adapted to fit into and be retained by a mounting recess 466. The mounting recess 466 is comprised of a cap, wider upper portion 447 and narrow lower portion 248 adapted to capture the post upper end 436. The post 434 and mounting recess 466 are illustrated in greater detail in a cross-sectional view at FIGS. 2B and 2C.

The characteristics of the thermoplastic are such that the mounting recess 466 and ridge 438 will flex and expand such that the mounting recess 466 can pass down over the bevel 437 and ridge 438. The ridge 438 then acts to discourage the mounting recess 466 from passing back over the ridge 438, where there is no bevel to assist from the bottom of the ridge 438. In a preferred embodiment, the post 434 may have a narrow region just below the post ridge 438 for the lower narrow portion 448 of the mounting recess 466 to fit with.

Interior to the inner wall 412 is a lower central platform 420, similar to that illustrated in greater detail at FIG. 2A. The lower central platform 420 may be a substantially flat plane positioned on the interior of the lid and bounded by the inner wall 412. As illustrated, the elevation of the lower central platform 420 is between the top of the channel 403 and the highest point on the upper surface 430. A vent hole 421 passes through the lower central platform 420 and allows steam to escape and alternatively, allows liquid to drain into the cup that may have accumulated on the lower central platform 420 as the liquid passes through the drinking opening 432. In a an alternate embodiment, the vent hole 421 may be adjacent to and in contact with the inner wall 412, where a portion of vent hole 421 travels vertically along the inner wall 412.

The second part of the two-part recloseable lid 400 comprises an arm 460. In this exemplary embodiment, the arm 460 is a large arm extending, along the curvature of the upper surface 430, between the drinking opening 432 and the plug recess 440, where the angle β 444 between the drinking opening 432 and the plug recess 440 is just less than 180 degrees. In a preferred exemplary embodiment with the large arm, the angle may be 170 degrees. In a preferred embodiment, the arm 460 comprises a thin piece of thermoformed plastic with an outer arm edge 470 and an inner arm edge 472, and terminates in an arm mounting end 462 and an arm plug end 464. In an alternate embodiment, the arm plug end terminates in a tab 467. The tab 467 may be inclined from the plane of the arm 460 to aid the user in grasping the arm.

Figure 2B:
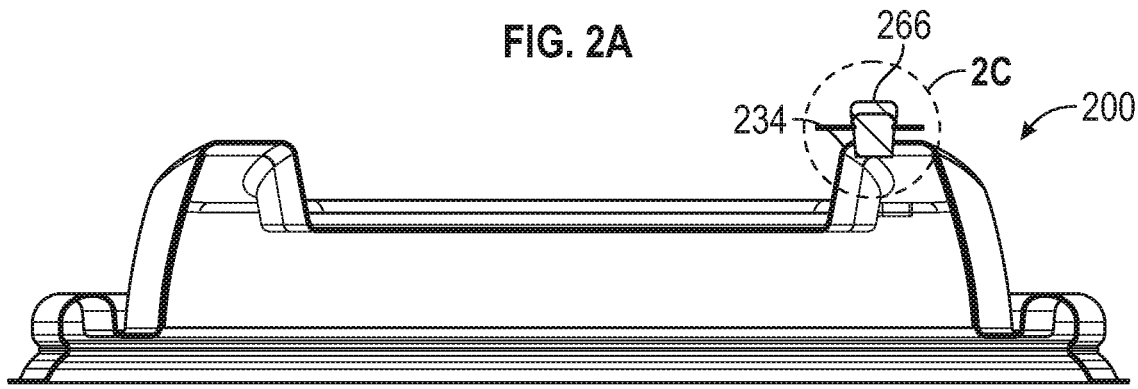
FIG. 2B is a side cutaway view of the embodiment of FIG. 2A.
Figure 2C:
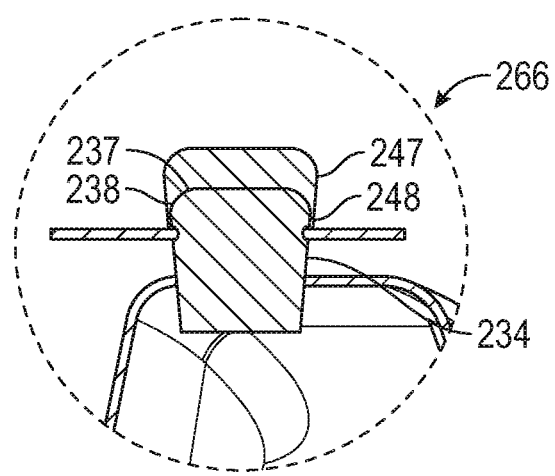
FIG. 2C is a detail view of the indicated portion of FIG. 2B showing the post structure.

The arm mounting end 462 and sub-features are substantially similar to those illustrated in FIGS. 2C and 2B. The 400 series reference numbers of the post 434 and related features, and the arm mounting end 462 and related features are illustrated in greater detail by their corresponding 200 series numbers on FIGS. 2C and 2B. The arm mounting end 462 comprises a mounting recess 466 adapted to retain the post upper end 436 and ridge 438. The mounting recess 466 comprises a cap that may protrude from the plane of the arm 460. The cap comprises a wider upper portion 447 adapted to receive the post upper end 436. More specifically, the wider upper portion 447 may be adapted to accept the ridge 438, where the inner diameter of the wider upper portion 447 is substantially similar, to the outer diameter of the ridge 438. If the diameters of the wider upper portion 447 and the ridge 438 are not substantially similar, the mounting recess 466 will fit loosely on the post upper end 436. If the outer diameter of the ridge 438 is larger than the inner diameter of the wider upper portion 447, then the mounting recess 466 may not fit down over the post upper end 436.

The inner diameter of the lower narrow portion 448 may be slightly less than the outer diameter of the ridge 438 so that the lower narrow portion 448 may expand slightly to allow the ridge 438 to pass through the lower narrow portion 448, assisted by the incline plane of the bevel 437, then retract back to the original diameter, which is less than the outer diameter of the ridge 438. The lower narrow portion 448 would then retain the ridge 438 above it. The lack of a bevel on the bottom side of the ridge reduces the ability of the ridge 438 to cause the lower narrow portion 448 to expand, thereby keeping the ridge 438, and the post upper end 436 within the mounting recess 466.

The arm plug end 464 comprises a plug 465 adapted to be received and retained by the plug recess 440 and the front plug recess 441. The arm 460, when mounted pivotally to the post 434, creates a two position configuration, with the first arm position describing a position of the arm where the arm plug end 464 is mated with and plugging the drink opening 432. The second arm position describes a position of the arm where the arm plug end 464 is mated with and secured in the plug recess 440.

Figure 5A:
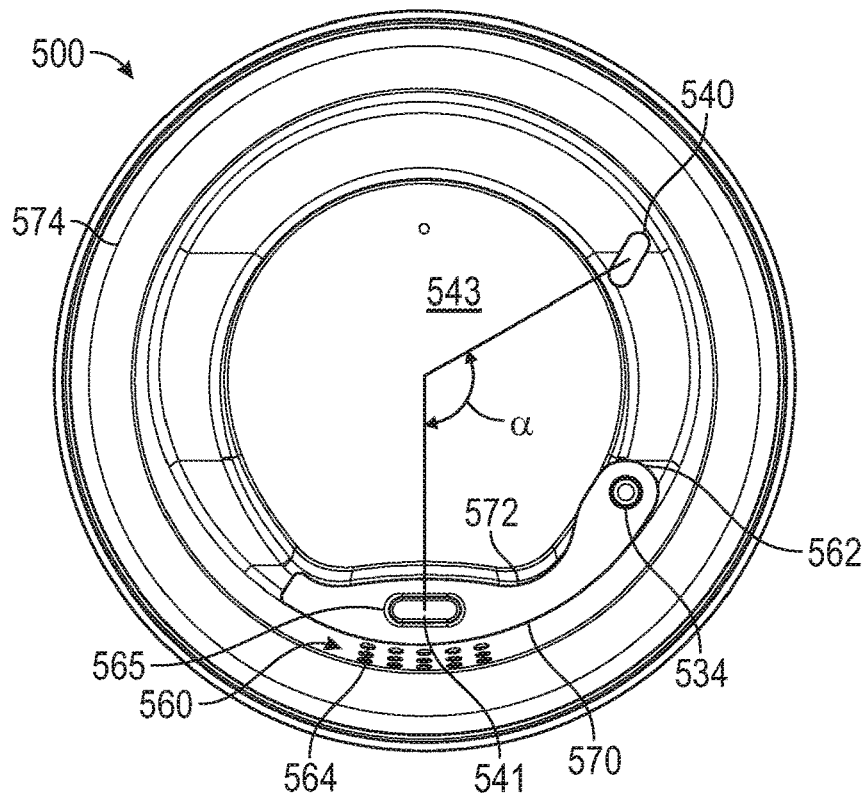
FIG. 5A is a top view of a preferred embodiment of a two part, recloseable, stackable and disposable lid according to the present invention having an arm with a mounting recess, without a tab on the arm for grasping, and a channel for attachment to a cup.

Referring now to FIG. 5, a two-part recloseable lid 500 is shown. In an exemplary embodiment, the first part, the recloseable lid 500, is manufactured with thin flexible plastic by conventional thermoforming. The recloseable lid 500 is adapted for mounting and attaching to a container (not shown), such as a disposable cup. As illustrated by FIG. 5A, an outer edge 502 is bounded interiorly by a channel 503 for mounting to a container. The outer edge 502 comprises a skirt 505 positioned outside of the channel 503. The channel 503 is defined by interior and exterior walls with a ceiling. The channel 503 is adapted to receive and retain a rim of a container, such as a cup. The channel 503 grips the rim of the container, holding it in place, creating a seal which resists the spillage of the container contents.

Recloseable lid 500 is further comprised of an upwardly extending outer wall 506 opposite an inner wall 512 with an upper surface 530 spaced between and extending from the top of each wall. As illustrated, the top plane of the upper surface 530 has a generally symmetrical gradual incline on both sides from the low point on a lower plane 516 at the rear of the lid and a higher plane 518 at the front of the lid. As illustrated, the higher plane 518 is the high point of the upper surface 530. In some embodiments, a lower valley 574 may be positioned between the channel 503 and the outer wall 506. In other embodiments the lower valley may be omitted, where the inside of the channel 503 is adjacent to the outer wall 506 or outer wall 506 extends upwardly from a point level with or higher than the channel 503.

At the front of the recloseable lid 500 in the upper surface 530 is a drink opening 532 extending upwardly through the upper surface 530. In a preferred embodiment, the drink opening 532 may be an elongated oval shape. The drinking opening 532 sits inside a front plug recess 541 and provides an aperture from which liquid can flow through. The front plug recess 541 is a cavity adapted to accept a plug 565, similar to that illustrated in greater detail at FIG. 1E. The front plug recess 541 is formed to substantially match the shape of the plug 565. The shape of the front plug recess 541 is adapted so that the mating with the plug 565 is such that the interface between the plug 565 and front plug recess 541 discourages the leaking or passing of liquid. The floor of the front plug recess 541 provides an area where the drinking opening 532 may be positioned.

The drinking opening 532 may be created by a punch. A method of punching openings in thermoplastic may lack precision in a mass producing manufacturing process. The front plug recess 541 provides a margin of error for the punch to create the drinking opening 532. This allows for the plug 565 to fit into the front plug recess 541 providing the leak discouraging properties even when the punching of the drinking opening may not be centered in the front plug recess 541, or consistent with the punch location.

Figure 5B:
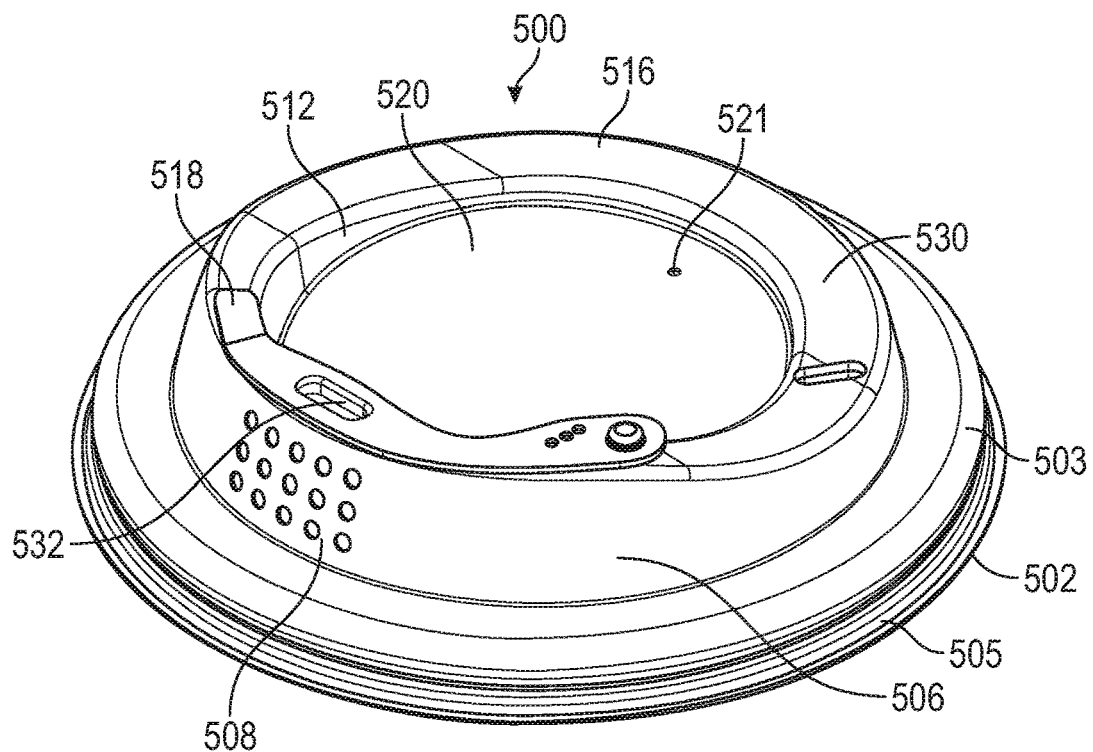
FIG. 5B is a perspective view of the embodiment of 5A.

At the front of the recloseable lid 500, on the outer face of the outer wall 506, centered on the drink opening 532, are recesses 508, shown at FIG. 5B. In some embodiments, the recesses 508 may instead be protrusions. In a preferred embodiment the recesses 508 or protrusions are circular in shape. The recesses 508 provide texture that a user, by the feel of the recesses 508, may position the recloseable lid 500 as it is attached to a container so that drink opening 532 is in front for drinking, centered for the users mouth. The recesses 508 may result in an increased surface area in the generally front facing portion of the outer wall. The increased surface area may provide a cooling effect on a beverage as it passes over the recesses 508. In an alternate embodiment, the recesses 508 may act to further insulate the user's mouth from a hot beverage inside the cup.

A plug recess 540 is positioned on and within the upper surface 532 at an angle α 543 from the drink opening 532. In a preferred embodiment, the angle between the drink opening 530 and the plug 565 recess 540 is between 60 degrees and 170 degrees. The plug 565 recess 540 is a cavity with a floor adapted to accept and retain a plug 565. At the midpoint between the drink opening 532 and the plug recess 540, a post 534, similar to that illustrated in greater detail in FIG. 2A, rises from the upper surface 530, substantially vertically. The post 534 and mounting recess 566 are illustrated in greater detail in a cross-sectional view at FIGS. 2B and 2C. The post 534 comprises a post shaft terminating in a beveled post upper end 536. The post upper end 536 comprises a ridge 538 positioned around the exterior of the post 534 below the post end bevel 537. The post end ridge 538 is adapted to fit into and be retained by a mounting recess 566. The mounting recess 566 is comprised of a cap, wider upper portion 547 and narrow lower portion 548 adapted to capture the post upper end 536. The post 534 and mounting recess 566 are further illustrated in a cross-sectional view at FIGS. 2B and 2C.

The characteristics of the thermoplastic are such that the mounting recess 566 and ridge 538 will flex and expand such that the mounting recess 566 can pass down over the bevel 537 and ridge 538. The ridge 538 then acts to discourage the mounting recess 566 from passing back over the ridge 538, where there is no bevel to assist from the bottom of the ridge 538. In a preferred embodiment, the post 534 may have a narrow region just below the post ridge 538 for the lower narrow portion 548 of the mounting recess 566 to fit with.

Interior to the inner wall 512 is a lower central platform 520, illustrated at FIG. 5B. The lower central platform 520 may be a substantially flat plane positioned on the interior of the lid and bounded by the inner wall 512. As illustrated, the elevation of the lower central platform 520 is between the top of the channel 503 and the highest point on the upper surface 530. A vent hole 521 passes through the lower central platform 520 and allows steam to escape and alternatively, allows liquid to drain into the cup that may have accumulated on the lower central platform 520 as the liquid passes through the drinking opening 532. In a an alternate embodiment, the vent hole 521 may be adjacent to and in contact with the inner wall 512, where a portion of vent hole 521 travels vertically along the inner wall 512.

The second part of the two-part recloseable lid 500 comprises an arm 560, illustrated at FIGS. 5A and 5B. With the exception of the omitted tab, the arm 560 and related sub-features are substantially similar to the arm illustrated in greater detail in FIG. 1E. In a preferred embodiment, the arm 560 comprises a thin piece of thermoformed plastic with an outer arm edge 570 and an inner arm edge 572, and terminates in an arm mounting end 562 and an arm plug end 564. In this exemplary embodiment, the arm 560 does not include a tab. A tab, as in other embodiments, may alter the way the lids are configured in a stacking arrangement. With the tab omitted, the arm 560 lays parallel with the upper surface 530 without any end section sticking up. This may allow the lids to stack more securely, or in a tighter configuration.

The arm mounting end 562 and sub-features are substantially similar to those illustrated in FIGS. 2C and 2B. The 500 series reference numbers of the post 534 and related features, and the arm mounting end 562 and related features are illustrated in greater detail by their corresponding 200 series numbers on FIGS. 2C and 2B. The arm mounting end 562 comprises a mounting recess 566 adapted to retain the post upper end 536 and ridge 538. The mounting recess 566 comprises a cap that may protrude from the plane of the arm 560. The cap comprises a wider upper portion 547 adapted to receive the post upper end 536. More specifically, the wider upper portion 547 may be adapted to accept the ridge 538, where the inner diameter of the wider upper portion 547 is substantially similar, to the outer diameter of the ridge 538. If the diameters of the wider upper portion 547 and the ridge 538 are not substantially similar, the mounting recess 566 will fit loosely on the post upper end 536. If the outer diameter of the ridge 538 is larger than the inner diameter of the wider upper portion 547, then the mounting recess 566 may not fit down over the post upper end 536.

The inner diameter of the lower narrow portion 548 may be slightly less than the outer diameter of the ridge 538 so that the lower narrow portion 548 may expand slightly to allow the ridge 538 to pass through the lower narrow portion 548, assisted by the incline plane of the bevel 537, then retract back to the original diameter, which is less than the outer diameter of the ridge 538. The lower narrow portion 548 would then retain the ridge 538 above it. The lack of a bevel on the bottom side of the ridge reduces the ability of the ridge 538 to cause the lower narrow portion 548 to expand, thereby keeping the ridge 538, and the post upper end 536 within the mounting recess 566.

The arm plug end 564 comprises a plug 565 adapted to be received and retained by the plug recess 540 and the front plug recess 541. The arm 560, when mounted pivotally to the post 534, creates a two position configuration, with the first arm position describing a position of the arm where the arm plug end 564 is mated with and plugging the drink opening 532. The second arm position describes a position of the arm where the arm plug end 564 is mated with and secured in the plug recess 540.

Figure 6A:
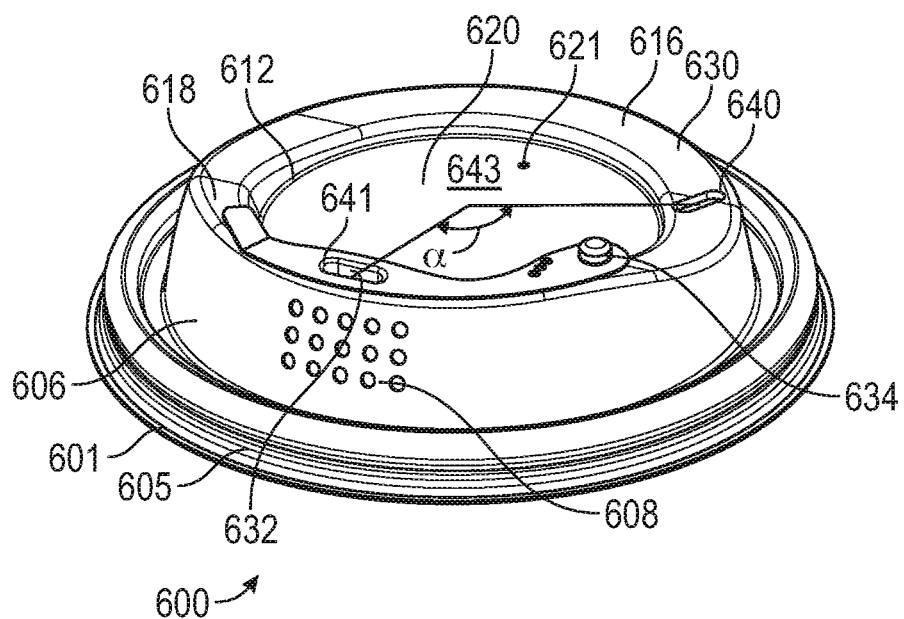
FIG. 6A is a perspective view of a preferred embodiment of a two part, recloseable, stackable and disposable lid according to the present invention having an arm with a mounting recess, a tab on the arm for grasping, and a sealing edge for attachment to a cup with the arm in a closed position.
Figure 6B:
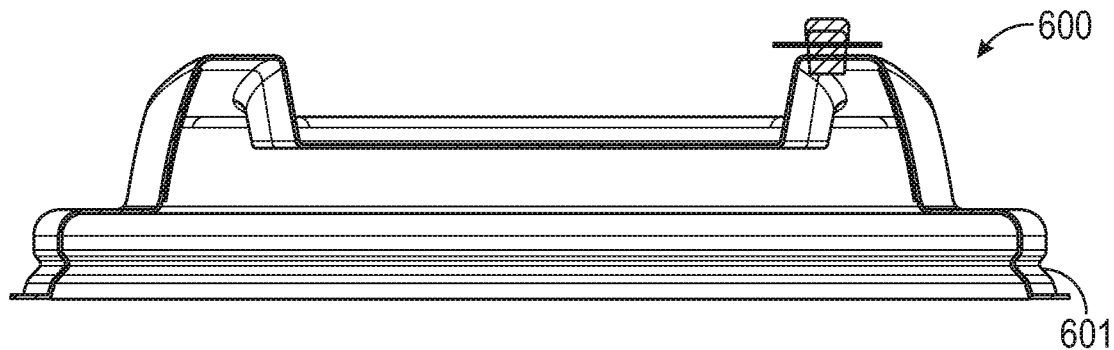
FIG. 6B is a side cutaway view of the embodiment of FIG. 6A.

Referring now to FIG. 6, a two-part recloseable lid 600 is shown. In an exemplary embodiment, the first part, the recloseable lid 600, is manufactured with thin flexible plastic by conventional thermoforming. The recloseable lid 600 is adapted for mounting and attaching to a container (not shown), such as a disposable cup. As illustrated by FIG. 6A, an outer edge 602 comprises a skirt 605. In this exemplary embodiment, the outer edge 602 and skirt 605 are shaped with a slight curve and indentation 601, running annularly in the horizontal plane, to retain a rim of a container, such as a cup. The indentation 601 functions to expand over the bead of a cup rim, and retract to its normal shape to retain the bead of a cup rim, creating a seal to keep the lid attached and prevent spillage. The omission of a channel in this embodiment allows for a tighter and denser stacking configuration.

Recloseable lid 600 is further comprised of an upwardly extending outer wall 606 opposite an inner wall 612 with an upper surface 630 spaced between and extending from the top of each wall. As illustrated, the top plane of the upper surface 630 has a generally symmetrical gradual incline on both sides from the low point on a lower plane 616 at the rear of the lid and a higher plane 618 at the front of the lid. As illustrated, the higher plane 618 is the high point of the upper surface 630

At the front of the recloseable lid 600 in the upper surface 630 is a drink opening 632 extending upwardly through the upper surface 630. In a preferred embodiment, the drink opening 632 may be an elongated oval shape. The drinking opening 632 sits inside a front plug recess 641 and provides an aperture from which liquid can flow through. The front plug recess 641 is a cavity adapted to accept a plug 665, similar to that illustrated in more detail at FIG. 1E. The front plug recess 641 is formed to substantially match the shape of the plug 665. The shape of the front plug recess 641 is adapted so that the mating with the plug 665 is such that the interface between the plug 665 and front plug recess 641 discourages the leaking or passing of liquid. The floor of the front plug recess 641 provides an area where the drinking opening 632 may be positioned.

The drinking opening 632 may be created by a punch. A method of punching openings in thermoplastic may lack precision in a mass producing manufacturing process. The front plug recess 641 provides a margin of error for the punch to create the drinking opening 632. This allows for the plug 665 to fit into the front plug recess 641 providing the leak discouraging properties even when the punching of the drinking opening may not be centered in the front plug recess 641, or consistent with the punch location.

At the front of the recloseable lid 600, on the outer face of the outer wall 606, centered on the drink opening 632, are recesses 608, shown at FIG. 6A. In some embodiments, the recesses 608 may instead be protrusions. In a preferred embodiment the recesses 608 or protrusions are circular in shape. The recesses 608 provide texture that a user, by the feel of the recesses 608, may position the recloseable lid 600 as it is attached to a container so that drink opening 632 is in front for drinking, centered for the users mouth. The recesses 608 may result in an increased surface area in the generally front facing portion of the outer wall. The increased surface area may provide a cooling effect on a beverage as it passes over the recesses 608. In an alternate embodiment, the recesses 608 may act to further insulate the user's mouth from a hot beverage inside the cup.

A plug recess 640 is positioned on and within the upper surface 632 at an angle α 643 from the drink opening 632. In a preferred embodiment, the angle between the drink opening 630 and the plug 665 recess 640 is between 60 degrees and 170 degrees. The plug 665 recess 640 is a cavity with a floor adapted to accept and retain a plug 665. At the midpoint between the drink opening 632 and the plug recess 640, a post 634, similar to that illustrated in greater detail in FIG. 2A, rises from the upper surface 630, substantially vertically. The post 634 and mounting recess 668 are illustrated in greater detail in a cross-sectional view at FIGS. 2B and 2C. The post 634 comprises a post shaft terminating in a beveled post upper end 636. The post upper end 636 comprises a ridge 638 positioned around the exterior of the post 634 below the post end bevel 637. The post end ridge 638 is adapted to fit into and be retained by a mounting recess 668. The mounting recess 668 is comprised of a cap, wider upper portion 247 and narrow lower portion 248 adapted to capture the post upper end 636. The post 634 and mounting recess 668 are further illustrated in a cross-sectional view at FIGS. 2B and 2C.

The characteristics of the thermoplastic are such that the mounting recess 668 and ridge 638 will flex and expand such that the mounting recess 668 can pass down over the bevel 637 and ridge 638. The ridge 638 then acts to discourage the mounting recess 668 from passing back over the ridge 638, where there is no bevel to assist from the bottom of the ridge 638. In a preferred embodiment, the post 634 may have a narrow region just below the post ridge 638 for the lower narrow portion 248 of the mounting recess 668 to fit with.

Interior to the inner wall 612 is a lower central platform 620, illustrated at FIG. 6A. The lower central platform 620 may be a substantially flat plane positioned on the interior of the lid and bounded by the inner wall 612. As illustrated, the elevation of the lower central platform 620 is between the indention 601 on the edge and the highest point on the upper surface 630. A vent hole 621 passes through the lower central platform 620 and allows steam to escape and alternatively, allows liquid to drain into the cup that may have accumulated on the lower central platform 620 as the liquid passes through the drinking opening 632. In a an alternate embodiment, the vent hole 621 may be adjacent to and in contact with the inner wall 612, where a portion of vent hole 621 travels vertically along the inner wall 612.

Figure 6C:
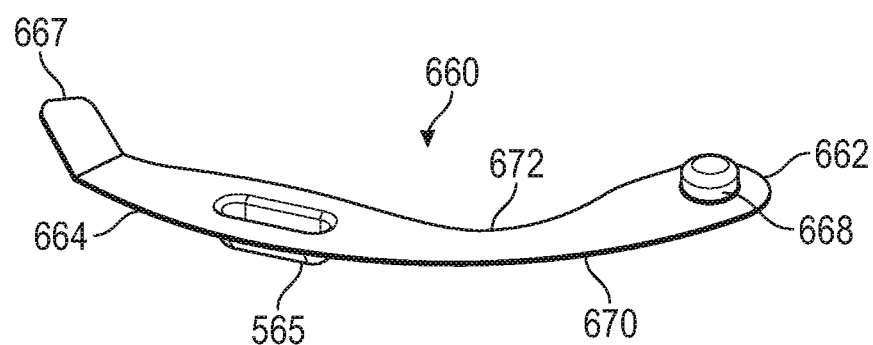
FIG. 6C is a perspective detail view of the arm structure of the embodiment shown in FIG. 6A.

The second part of the two-part recloseable lid 600 comprises an arm 660, illustrated at FIG. 6C. In a preferred embodiment, the arm 660 comprises a thin piece of thermoformed plastic with an outer arm edge 670 and an inner arm edge 672, and terminates in an arm mounting end 662 and an arm plug end 664. In an alternate embodiment, the arm plug end terminates in a tab 667. The tab 667 may be inclined from the plane of the arm 660 to aid the user in grasping the arm.

The arm mounting end 662 and sub-features are substantially similar to those illustrated in FIGS. 2C and 2B. The 600 series reference numbers of the post 634 and related features, and the arm mounting end 662 and related features are illustrated in greater detail by their corresponding 200 series numbers on FIGS. 2C and 2B. The arm mounting end 662 comprises a mounting recess 668 adapted to retain the post upper end 636 and ridge 638. The mounting recess 668 comprises a cap that may protrude from the plane of the arm 660. The cap comprises a wider upper portion 647 adapted to receive the post upper end 636. More specifically, the wider upper portion 647 may be adapted to accept the ridge 638, where the inner diameter of the wider upper portion 647 is substantially similar, to the outer diameter of the ridge 638. If the diameters of the wider upper portion 647 and the ridge 638 are not substantially similar, the mounting recess 668 will fit loosely on the post upper end 636. If the outer diameter of the ridge 638 is larger than the inner diameter of the wider upper portion 647, then the mounting recess 668 may not fit down over the post upper end 636.

The inner diameter of the lower narrow portion 648 may be slightly less than the outer diameter of the ridge 638 so that the lower narrow portion 648 may expand slightly to allow the ridge 638 to pass through the lower narrow portion 648, assisted by the incline plane of the bevel 637, then retract back to the original diameter, which is less than the outer diameter of the ridge 638. The lower narrow portion 648 would then retain the ridge 638 above it. The lack of a bevel on the bottom side of the ridge reduces the ability of the ridge 638 to cause the lower narrow portion 648 to expand, thereby keeping the ridge 638, and the post upper end 636 within the mounting recess 668.

The arm plug end 664 comprises a plug 665 adapted to be received and retained by the plug recess 640 and the front plug recess 641. The arm 660, when mounted pivotally to the post 634, creates a two position configuration, with the first arm position describing a position of the arm where the arm plug end 664 is mated with and plugging the drink opening 632. The second arm position describes a position of the arm where the arm plug end 664 is mated with and secured in the plug recess 640.

Figure 7A:
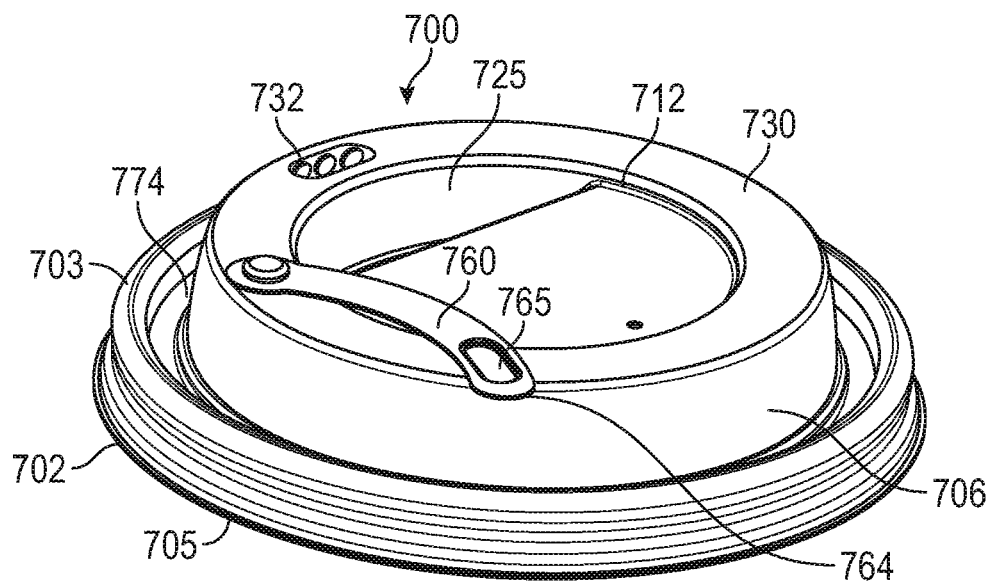
FIG. 7A is a perspective view of a preferred embodiment of a two part, recloseable, stackable and disposable lid according to the present invention having an arm with a mounting opening, with a generally flat upper surface, and a channel for attachment to a cup with the arm in the open position.
Figure 7B:
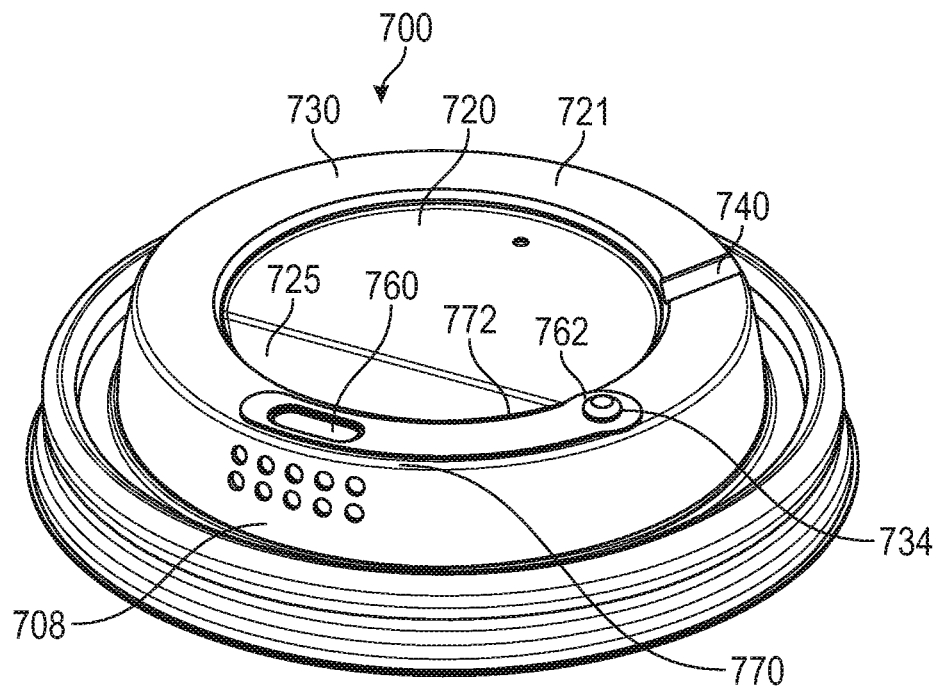
FIG. 7B is a perspective view of the embodiment of FIG. 7A with the arm in a closed position.
Figure 7C:
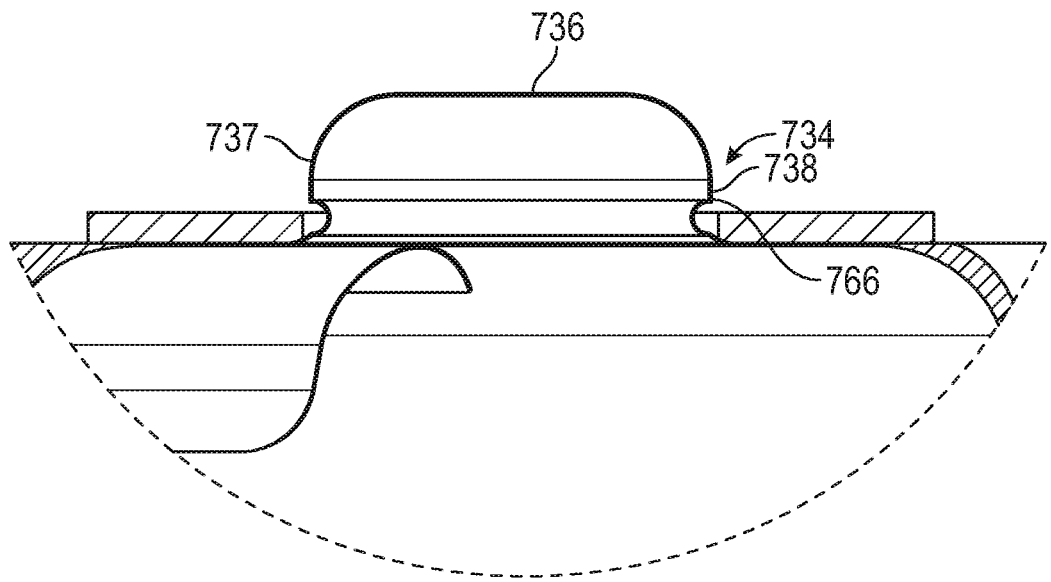
FIG. 7C is a side, cutaway, detail view of the embodiment of FIG. 7A showing the arm at the attachment point.
Figure 7D:
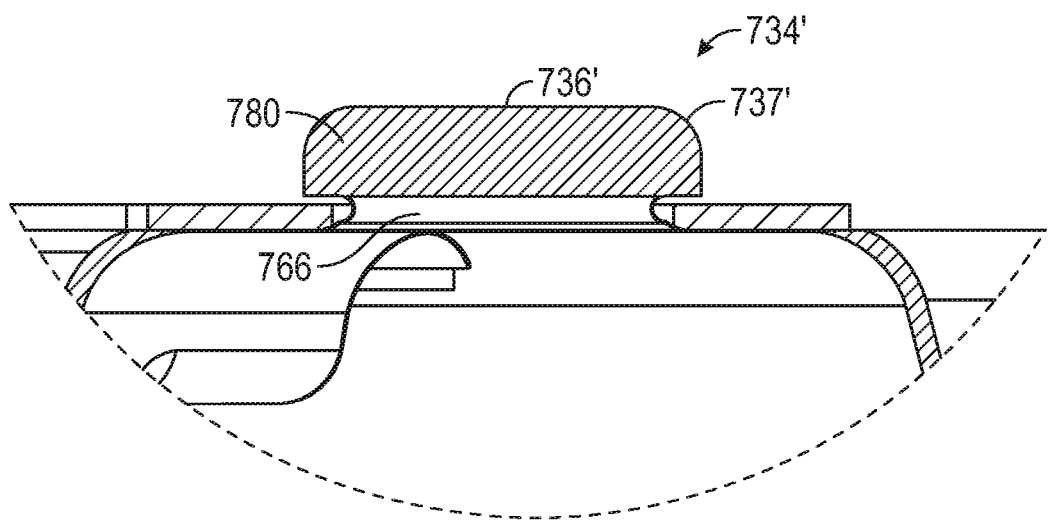
FIG. 7D is a side, cutaway, detail view of the attachment point shown in FIG. 7A with the arm removed.
Figure 8A:
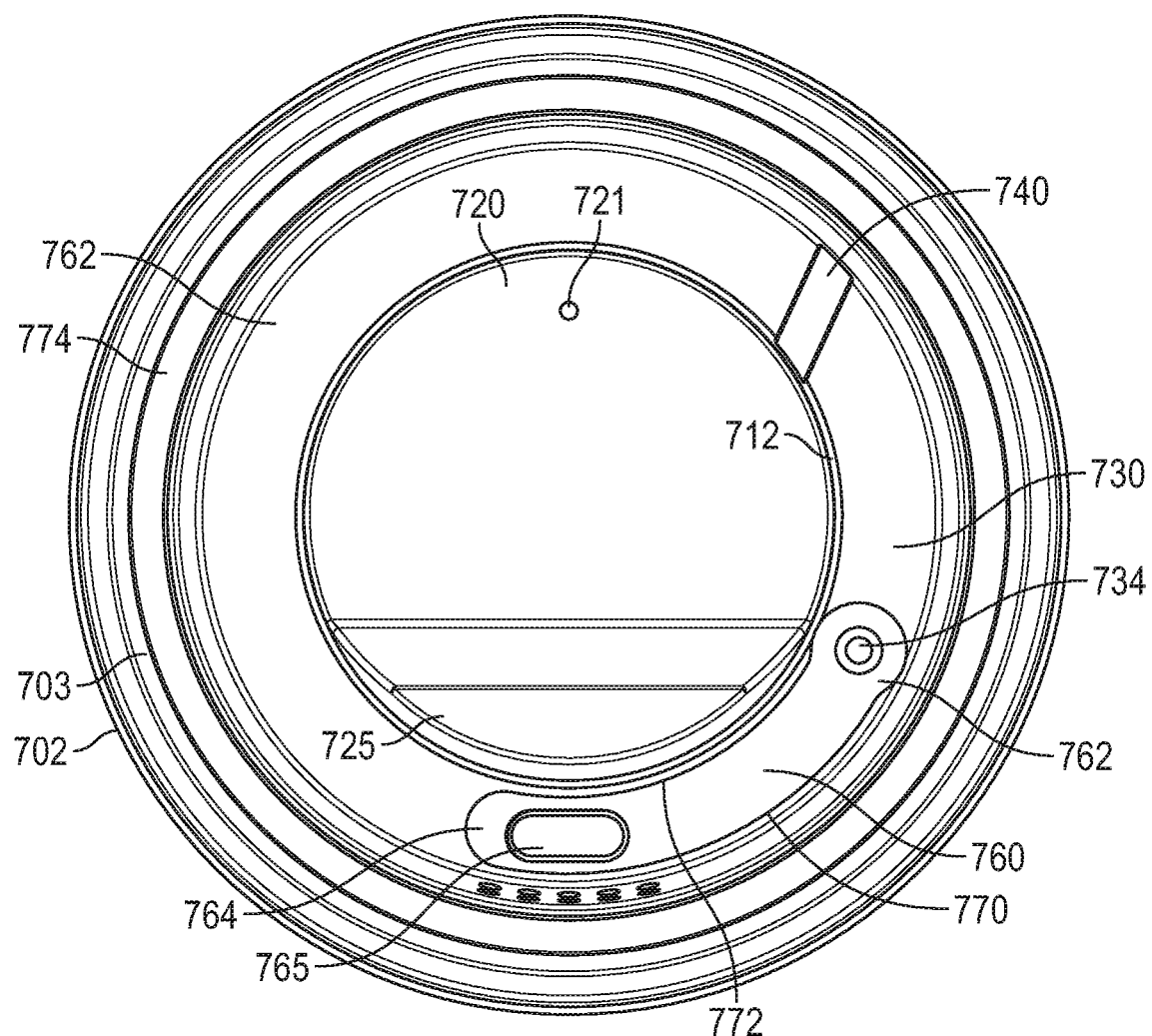
FIG. 8A is a top view further illustrating the embodiment shown in FIG. 7 with the arm in a closed position.
Figure 8B:
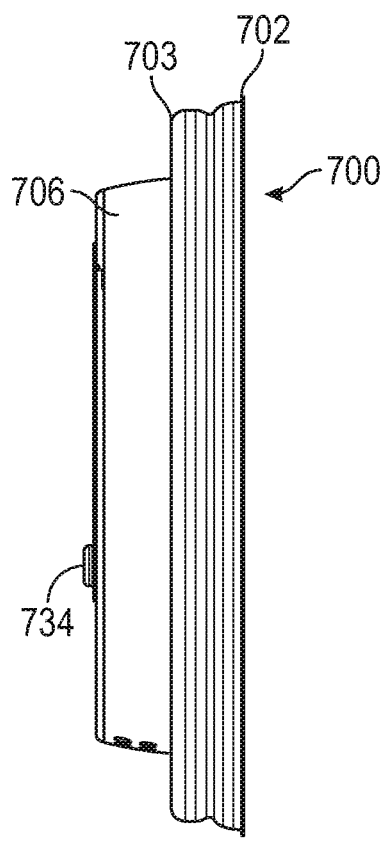
FIG. 8B is a first side view of the embodiment shown in FIG. 7.
Figure 8C:
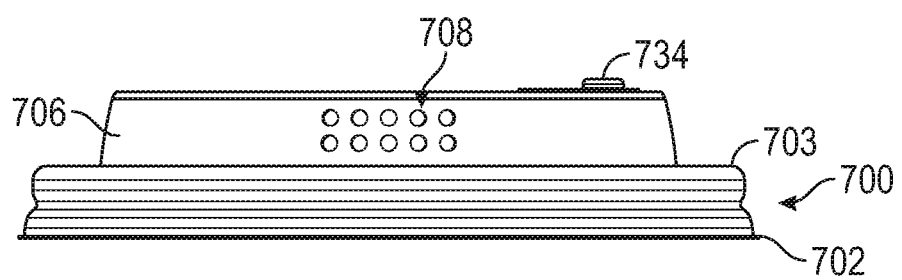
FIG. 8C is a second side view of the embodiment shown in FIG. 7.

Referring now to FIGS. 7 and 8, a two-part recloseable lid 700 is shown. In an exemplary embodiment, the first part, the recloseable lid 700, is manufactured with thin flexible plastic by conventional thermoforming. The recloseable lid 700 is adapted for mounting and attaching to a container (not shown), such as a disposable cup. As illustrated by FIGS. 7A, 7B, and 8A-C, an outer edge 702 is bounded interiorly by a channel 703 for mounting to a container. The outer edge 702 comprises a skirt 705 positioned outside of the channel 703. The channel 703 is defined by interior and exterior walls with a ceiling. The channel 703 is adapted to receive and retain a rim of a container, such as a cup. The channel 703 grips the rim of the container, holding it in place, preferably creating a seal which resists the spillage of the container contents.

Recloseable lid 700 is further comprised of an upwardly extending outer wall 706 opposite an inner wall 712 with an upper surface 730 spaced between and extending from the top of each wall. In this exemplary embodiment, as illustrated, the top plane of the upper surface 730 is preferably generally flat with no pronounced incline. This embodiment allows the drink opening 732 to be on substantially the same plane as post 734, which may provide convenient stacking or manufacturing options. In some embodiments, a lower valley 774 may be positioned between the channel 703 and the outer wall 706. In other embodiments (not illustrated) the lower valley may be omitted, where the inside of the channel 703 is adjacent to the outer wall 706 or outer wall 706 extends upwardly from a point level with or higher than the channel 703.

At the front of the recloseable lid 700 in the upper surface 730 is a drink opening 732 extending upwardly through the upper surface 730. In a preferred embodiment, the drink opening 732 may be an elongated oval shape. The drink opening 732 provides an aperture from which liquid can flow through. The drink opening 732 is formed to substantially match the shape of the plug 765. The shape of the drink opening 732 is adapted so that the mating with the plug 765 is such that the interface between the plug 765 and drink opening 732 discourages the leaking or passing of liquid. In some embodiments, the drinking opening 732 may be created by a punch.

At the front of the recloseable lid 700, on the outer face of the outer wall 706, centered on the drink opening 732, are recesses 708, shown at figure A. In some embodiments, the recesses 708 may instead be protrusions. In a preferred embodiment the recesses 708 or protrusions are circular in shape. The recesses 708 provide texture that a user, by the feel of the recesses 708, may position the recloseable lid 700 as it is attached to a container so that drink opening 732 is in front for drinking, centered for the users mouth. The recesses 708 may result in an increased surface area in the generally front facing portion of the outer wall. The increased surface area may provide a cooling effect on a beverage as it passes over the recesses 708. In an alternate embodiment, the recesses 708 may act to further insulate the user's mouth from a hot beverage inside the cup.

A plug recess channel 740 is positioned on and within the upper surface 732 at an angle from the drink opening 732 dependent on the length and curvature of arm 760. In a preferred embodiment, the angle between the drink opening 730 and the plug recess channel 740 is between 60 degrees and 170 degrees. The plug recess channel 740, as illustrated, is an open-ended cavity with a floor adapted to accept and retain a plug 765. In alternate embodiments it may be a cavity or a notch. In this particular embodiment, the open-ended channel configuration of plus recess channel 740 may provide more convenient plug retention due to the lack of end walls, allowing the plug 765 to more readily slide into plug recess channel 740. At the midpoint between the drink opening 732 and the plug recess 740, a post 734 or 734', similar to that illustrated in greater detail in FIG. 2A, rises from the upper surface 730, substantially vertically. Two alternate embodiments of post 734 are illustrated in greater detail in a cross-sectional view at FIGS. 7C and 7D. The post 734 comprises a post shaft terminating in a beveled post upper end 736. Referring to the embodiment illustrated in FIG. C, the post upper end 736 comprises a ridge 738 positioned around the exterior of the post 734 below the post end bevel 737. The post end ridge 738 is adapted to fit into and be retained by mounting hole 766, or alternatively by a mounting recess has described in previous embodiments in FIG. 2. A preferred post embodiment for use with a mounting recess on the arm may be the post 734 illustrated at FIG. 7c. Referring to the embodiment illustrated in FIG. D, the post upper end 736' comprises a mushroomed upper end 780 of the post 734'. The mushroomed upper end 780 is adapted to fit into and be retained by mounting hole 766 once the mushrooming step has taken place. In this exemplary embodiment, the mushroomed upper end 780 may provide advantages in the manufacturing process, such that a simple generally straight post may be formed via the normal thermoforming or similar process, and then a second mechanical step may provide the mushrooming of the post on the end after the mounting hole 766 has been placed over the post 736'. This may be advantageous where thermoforming techniques have difficulty in conveniently creating mushroomed type post ends. The mushroomed upper end 780 may provide a more secure fit and convenient process for the attachment of arm 760 via the mounting hole 766.

Interior to the inner wall 712 is a lower central platform 720, illustrated at FIGS. 7A, 7B, and 8A. The lower central platform 720 may be a substantially flat plane positioned on the interior of the lid and bounded by the inner wall 712. As illustrated, the elevation of the lower central platform 720 is between the top of the channel 703 and the highest point on the upper surface 730. A vent hole 721 passes through the lower central platform 720 and allows steam to escape and alternatively, allows liquid to drain into the cup that may have accumulated on the lower central platform 720 as the liquid passes through the drinking opening 732. In a an alternate embodiment (not illustrated), the vent hole may be adjacent to and in contact with the inner wall 712, where a portion of vent hole travels vertically along the inner wall 712. A spill reservoir 725 is forward of the lower central platform 720 and generally centered on drink opening 732. The spill reservoir 725 has a sloping wall descending from lower central platform 720. The sloping wall of the spill reservoir 725 meets inner wall 712 and forms the floor of the reservoir. In some embodiments, the spill reservoir 725 may have a flat base floor in between inner wall 712 and the sloping wall. The spill reservoir may preferably allow overrun liquid to collect there instead of overflowing the top of the upper surface 730 and also preferably provide mouth clearance for a user while drinking.

The second part of the two-part recloseable lid 700 comprises an arm 760, illustrated at FIGS. 7A, 7B and 8A. With the exception of the omitted tab, the arm 760 and related sub-features are substantially similar to the arm illustrated in greater detail in FIG. 1E. In a preferred embodiment, the arm 760 comprises a thin piece of thermoformed plastic with an outer arm edge 770 and an inner arm edge 772, and terminates in an arm mounting end 762 and an arm plug end 764. In this exemplary embodiment, the arm 760 does not include a tab. A tab, as in other embodiments, may alter the way the lids are configured in a stacking arrangement. With the tab omitted, the arm 760 lays parallel with the upper surface 730 without any end section sticking up. This may allow the lids to stack more securely, or in a tighter configuration.

The arm mounting end 762 and sub-features are substantially similar to those illustrated in and described in reference to FIG. 1. The 700 series reference numbers of the post 734 and related features, and the arm mounting end 762 and related features are illustrated in greater detail by their corresponding 100 series numbers on FIG. 1. The arm mounting end 762 comprises a mounting hole 766 adapted to retain the post upper end 736 similar to that described with reference to FIG. 1, or 736' and mushroomed upper end 780. The mounting hole 766 comprises an opening in the plane of the arm 760. The characteristics of the thermoplastic are such that the mounting hole 766 and ridge 738 may flex and expand such that the mounting hole 766 can pass down over the bevel 737 and ridge 738. The ridge 738 may then act as a stop to discourage the mounting hole 766 from passing back over the ridge 738, where there is no bevel to assist from the bottom of the ridge 738. In a preferred embodiment, the post may have a narrow region just below the post ridge 738 for the edge of the mounting hole 766 to rest in. In this embodiment the gradient of the post diameter, where the narrow region begins, would act as a stop preventing the mounting hole from sliding down the post. In some embodiments using the second mushrooming step on post 736', there may be no bevel, as the mounting hole 766 may preferably be placed over a simple straight post 734' with the post upper end 736' then being mushroomed by a mechanical step to hold the arm in place by expanding the post upper end 736' prime into mushroomed upper end 780. The wider diameter of mushroomed upper end 780 may preferably act to retain mounting hole 766 and thus attach arm 760 to post 734'.

The arm plug end 764 comprises a plug 765 adapted to be received and retained by the plug recess channel 740 and drink opening 732. The arm 760, when mounted pivotally to the post 734 or 734', creates a two position configuration, with the first arm position describing a position of the arm where the arm plug end 764 is mated with and plugging the drink opening 732. The second arm position describes a position of the arm where the arm plug end 764 is mated with and secured in the plug recess channel 740.

Figure 9A:
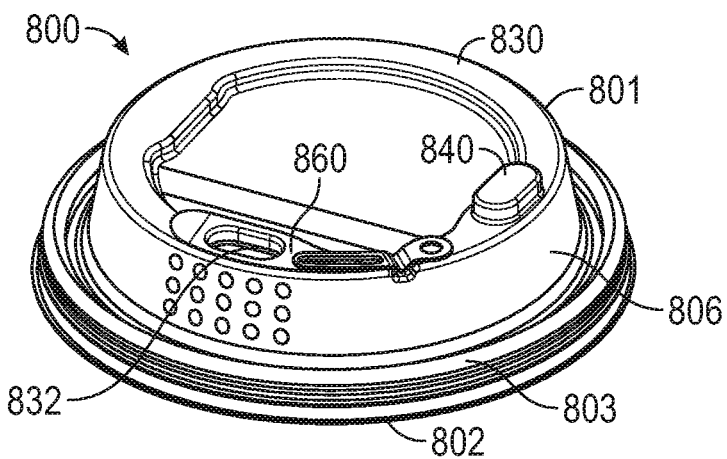
FIG. 9A is a perspective view of a preferred embodiment of a two part, reclosable, stackable and disposable lid according to the present invention having a folding arm in a closed position.
Figure 9B:
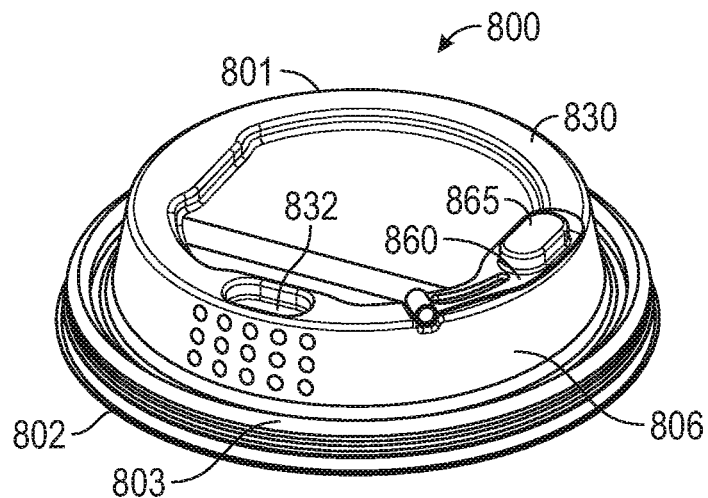
FIG. 9B is a perspective view of the embodiment of FIG. 9A with the arm in an open position.
Figure 10:
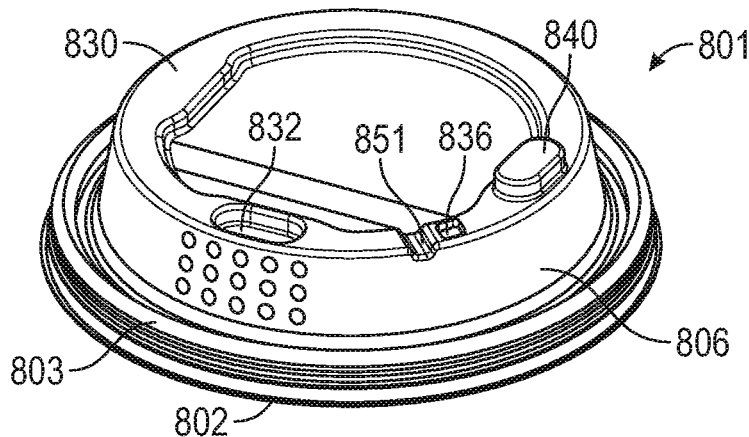
FIG. 10 is a perspective view of the lid embodiment of FIG. 9 with the arm detached.

Referring now to FIGS. 9 and 10, a two-part recloseable lid 800 is shown and is made up of lid-portion 801 and arm 860. In an exemplary embodiment, the first part, lid portion 801, is manufactured with thin flexible plastic by conventional thermoforming. Lid portion 801 is adapted for mounting and attaching to a container (not shown), such as a disposable cup. As illustrated by FIG. 9A, an outer edge 802 is bounded interiorly by a channel 803 for mounting to a container. The channel 803 is defined by interior and exterior walls with a ceiling. The channel 803 is adapted to receive and retain a rim of a container, such as a cup. The channel 803 grips the rim of the container, holding it in place, creating a seal which resists the spillage of the container contents.

Lid portion 801 is further comprised of an upwardly extending outer wall 806 with an upper surface 830 extending from upwardly extending outer wall 806. While the illustrated embodiment includes a depressed central surface, such a feature is not required.

At the front of lid portion 801, in the upper surface 830, is a drink opening 832, extending upwardly through the upper surface 830. In a preferred embodiment, the drink opening 832 may be an elongated oval shape from which liquid can flow through. The shape of drink opening 832 is adapted so that the mating with the plug 865 (described below) is such that the interface between the plug 865 and drink opening 832 discourages the leaking or passing of liquid. Drink opening 832 may be directly in upper surface 830 or in a recessed area as illustrated and described in connection with previously described embodiments.

A restraining plug 840 is positioned on upper surface 830. Restraining plug 840 is adapted to accept and retain a plug 865.

As is illustrated in FIG. 10, mounting recess 836 is adapted to receive post 866 (described below), which may conveniently be configured as has been detailed in descriptions of similar recesses and posts in previously described embodiments.

Figure 12:
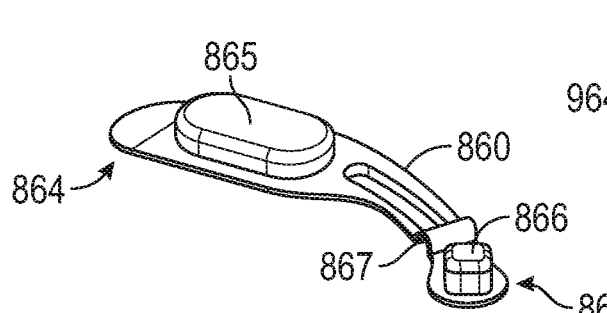
FIG. 12 is a perspective view of an arm suitable for use with the lid embodiment of FIG. 10.

The second part of the two-part recloseable lid 800 comprises an arm 860, illustrated in a first closed position at FIG. 9A, and at a second open position at FIG. 9B. Referring to FIG. 12, arm embodiment 860 is a thin piece of thermoformed plastic with arm mounting end 862 and an arm plug end 864. In an alternate embodiment, the arm plug end 864 may further include an angled tab (not illustrated) to aid user in grasping the arm. As illustrated, arm 860 is curved to substantially match the curve of upper surface 830.

The arm mounting end 862 comprises a downwardly facing post 866 adapted to be received by mounting recess 836. Arm plug end 864 comprises a plug 865 adapted to be received and retained by drink opening 832. The arm 860, when mounted, creates a two position configuration, with the first arm position describing a position of the arm where the arm is unfolded and arm plug end 864 is mated with and plugging the drink opening 832. The second arm position describes a folded position of the arm where the arm plug end 864 is mated with and secured by restraining plug 840.

Folding may be facilitated in a variety of ways, including by incorporating a flat section (not illustrated) adapted to allow folding at an appropriate location or by a score line (also not illustrated) adapted to allow the fold to occur at the correct location. Other variations are also possible, including one or more notches or areas of narrower width and other means commonly used in the thermoplastics industry to encourage folding at a particular location.

As illustrated, arm 860 comprises a convex section 867 to encourage folding at an optimal location. Where convex section 867 is used, valley 851 may conveniently be added to upper surface 830 (see FIG. 10) to receive convex section 867 when arm 860 is in an unfolded position.

Figure 11:
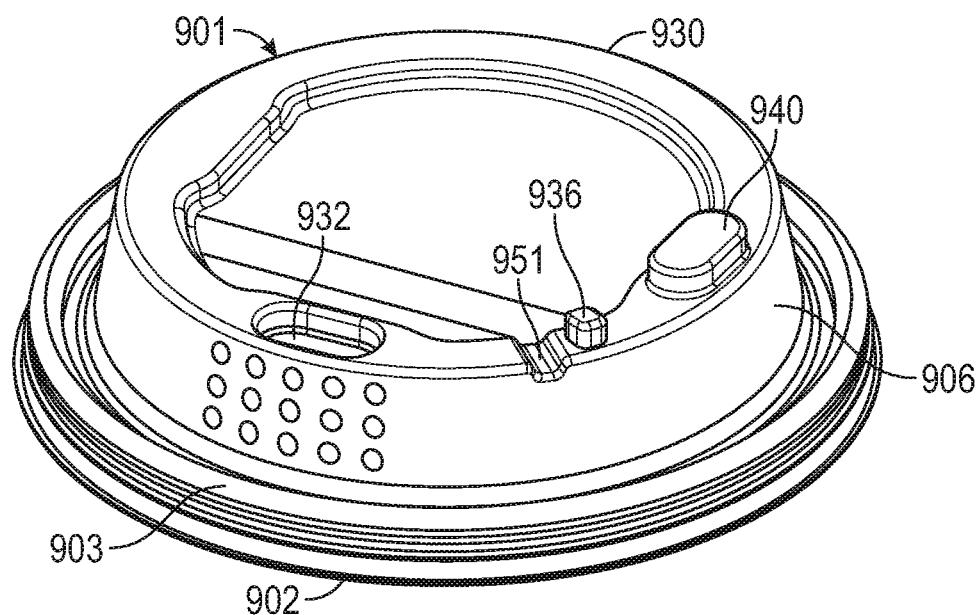
FIG. 11 as a perspective view of an alternate lid embodiment suitable for use with a folding arm.
Figure 13:
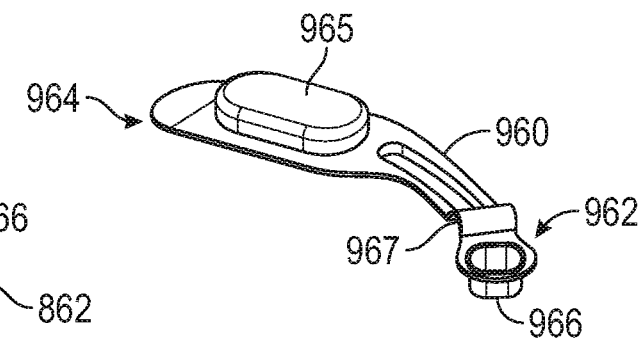
FIG. 13 is a perspective view of an arm embodiment suitable for use with the lid embodiment of FIG. 11.

As will be understood by those of skill in the art in light of the foregoing disclosure, a variety of arm/lid configurations and arm attachment means are possible, all within the scope of the present invention. Referring to FIG. 11, for example, lid portion 901 is shown, which is essentially identical to lid portion 801 previously described, with outer edge 902, channel 903, outer wall 906, upper surface 930, drink opening 932, optional valley 951, and restraining plug 940. The mounting means for arm 960 (see FIG. 13), however, is reversed such that arm mounting end 962 has a receptacle 966 adapted to receive post 936 on lid portion 901, which may be configured as has been described in connection with other embodiments. In this way, it is seen that the connecting means on lid portion 801 and arm 860 is essentially the inverse of that on lid portion 901 and arm 960. Which is used is largely a matter of choice. In other respects, arm 960 (with mounting end 962, plug end 964, plug 965, and convex section 967) is essentially identical to arm 860.

Where a folding arm configuration is desired, other arm mounting means are also possible including the use of adhesive (which is acceptable where arm rotation is not required), having an arm mounting tab (not illustrated) adapted to be received into a slot (not illustrated) on the upper surface, and having a lid mounting tab (not illustrated) in an upper surface of a lid portion (not illustrated) and a matching slot in an arm mounting end (not illustrated). Such means, while possible, may be less convenient for assembly, however. The means shown in connection with the figures allow all assembly to be performed by pressing after the parts have been formed, without the need to add adhesives or fit tabs into slots. Which means are used, however, are a matter of choice depending on the selected manufacturing process.

Figure 14:
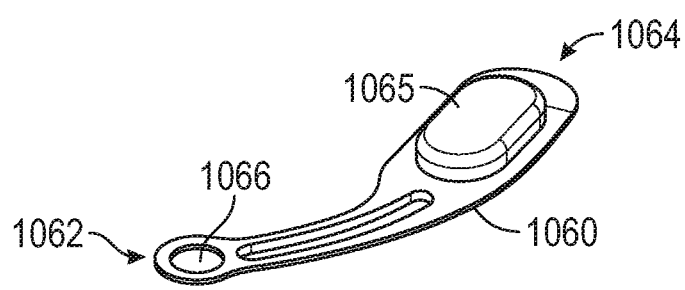
FIG. 14 is a perspective view of an alternate arm embodiment.

Similarly, arm 1060 in FIG. 14 (with arm mounting end 1062, arm plug end 1064 and plug 1065) shows a still further mounting means. Arm mounting end 1062 includes hole 1066 adapted to receive (for example) post 936 in FIG. 11 or post 136 in FIG. 1E. Holes and receptacles of the nature illustrated may be round and thus adapted for rotation. Where rotation is not needed (e.g. in folded arm embodiments), they may be of other shapes including square, octagonal, rectangular, triangular, etc. Round configurations, however, may be more forgiving for press assembly depending on the manufacturing method chosen. But the other configurations are also possible.

Referring now to FIGS. 9 and 10, a two-part recloseable lid 800 is shown and is made up of lid-portion 801 and arm 860. In an exemplary embodiment, the first part, lid portion 801, is manufactured with thin flexible plastic by conventional thermoforming. Lid portion 801 is adapted for mounting and attaching to a container (not shown), such as a disposable cup. As illustrated by FIG. 9A, an outer edge 802 is bounded interiorly by a channel 803 for mounting to a container. The channel 803 is defined by interior and exterior walls with a ceiling. The channel 803 is adapted to receive and retain a rim of a container, such as a cup. The channel 803 grips the rim of the container, holding it in place, creating a seal which resists the spillage of the container contents.

Lid portion 801 is further comprised of an upwardly extending outer wall 806 with an upper surface 830 extending from upwardly extending outer wall 806. While the illustrated embodiment includes a depressed central surface, such a feature is not required.

At the front of lid portion 801, in the upper surface 830, is a drink opening 832, extending upwardly through the upper surface 830. In a preferred embodiment, the drink opening 832 may be an elongated oval shape from which liquid can flow through. The shape of drink opening 832 is adapted so that the mating with the plug 865 (described below) is such that the interface between the plug 865 and drink opening 832 discourages the leaking or passing of liquid. Drink opening 832 may be directly in upper surface 830 or in a recessed area as illustrated and described in connection with previously described embodiments.

A restraining plug 840 is positioned on upper surface 830. Restraining plug 840 is adapted to accept and retain a plug 865.

As is illustrated in FIG. 10, mounting recess 836 is adapted to receive post 866 (described below), which may conveniently be configured as has been detailed in descriptions of similar recesses and posts in previously described embodiments.

The second part of the two-part recloseable lid 800 comprises an arm 860, illustrated in a first closed position at FIG. 9A, and at a second open position at FIG. 9B. Referring to FIG. 12, arm embodiment 860 is a thin piece of thermoformed plastic with arm mounting end 862 and an arm plug end 864. In an alternate embodiment, the arm plug end 864 may further include an angled tab (not illustrated) to aid user in grasping the arm. As illustrated, arm 860 is curved to substantially match the curve of upper surface 830.

The arm mounting end 862 comprises a downwardly facing post 866 adapted to be received by mounting recess 836. Arm plug end 864 comprises a plug 865 adapted to be received and retained by drink opening 832. The arm 860, when mounted, creates a two position configuration, with the first arm position describing a position of the arm where the arm is unfolded and arm plug end 864 is mated with and plugging the drink opening 832. The second arm position describes a folded position of the arm where the arm plug end 864 is mated with and secured by restraining plug 840.

Folding may be facilitated in a variety of ways, including by incorporating a flat section (not illustrated) adapted to allow folding at an appropriate location or by a score line (also not illustrated) adapted to allow the fold to occur at the correct location. Other variations are also possible, including one or more notches or areas of narrower width and other means commonly used in the thermoplastics industry to encourage folding at a particular location.

As illustrated, arm 860 comprises a convex section 867 to encourage folding at an optimal location. Where convex section 867 is used, valley 851 may conveniently be added to upper surface 830 (see FIG. 10) to receive convex section 867 when arm 860 is in an unfolded position.

As will be understood by those of skill in the art in light of the foregoing disclosure, a variety of arm/lid configurations and arm attachment means are possible, all within the scope of the present invention. Referring to FIG. 11, for example, lid portion 901 is shown, which is essentially identical to lid portion 801 previously described, with outer edge 902, channel 903, outer wall 906, upper surface 930, drink opening 932, optional valley 951, and restraining plug 940. The mounting means for arm 960 (see FIG. 13), however, is reversed such that arm mounting end 962 has a receptacle 966 adapted to receive post 936 on lid portion 901, which may be configured as has been described in connection with other embodiments. In this way, it is seen that the connecting means on lid portion 801 and arm 860 is essentially the inverse of that on lid portion 901 and arm 960. Which is used is largely a matter of choice. In other respects, arm 960 (with mounting end 962, plug end 964, plug 965, and convex section 967) is essentially identical to arm 860.

Where a folding arm configuration is desired, other arm mounting means are also possible including the use of adhesive (which is acceptable where arm rotation is not required), having an arm mounting tab (not illustrated) adapted to be received into a slot (not illustrated) on the upper surface, and having a lid mounting tab (not illustrated) in an upper surface of a lid portion (not illustrated) and a matching slot in an arm mounting end (not illustrated). Such means, while possible, may be less convenient for assembly, however. The means shown in connection with the figures allow all assembly to be performed by pressing after the parts have been formed, without the need to add adhesives or fit tabs into slots. Which means are used, however, are a matter of choice depending on the selected manufacturing process.

Similarly, arm 1060 in FIG. 14 (with arm mounting end 1062, arm plug end 1064 and plug 1065) shows a still further mounting means. Arm mounting end 1062 includes hole 1066 adapted to receive (for example) post 936 in FIG. 11 or post 136 in FIG. 1E. Holes and receptacles of the nature illustrated may be round and thus adapted for rotation. Where rotation is not needed (e.g. in folded arm embodiments), they may be of other shapes including square, octagonal, rectangular, triangular, etc. Round configurations, however, may be more forgiving for press assembly depending on the manufacturing method chosen. But the other configurations are also possible.

Figure 15A:
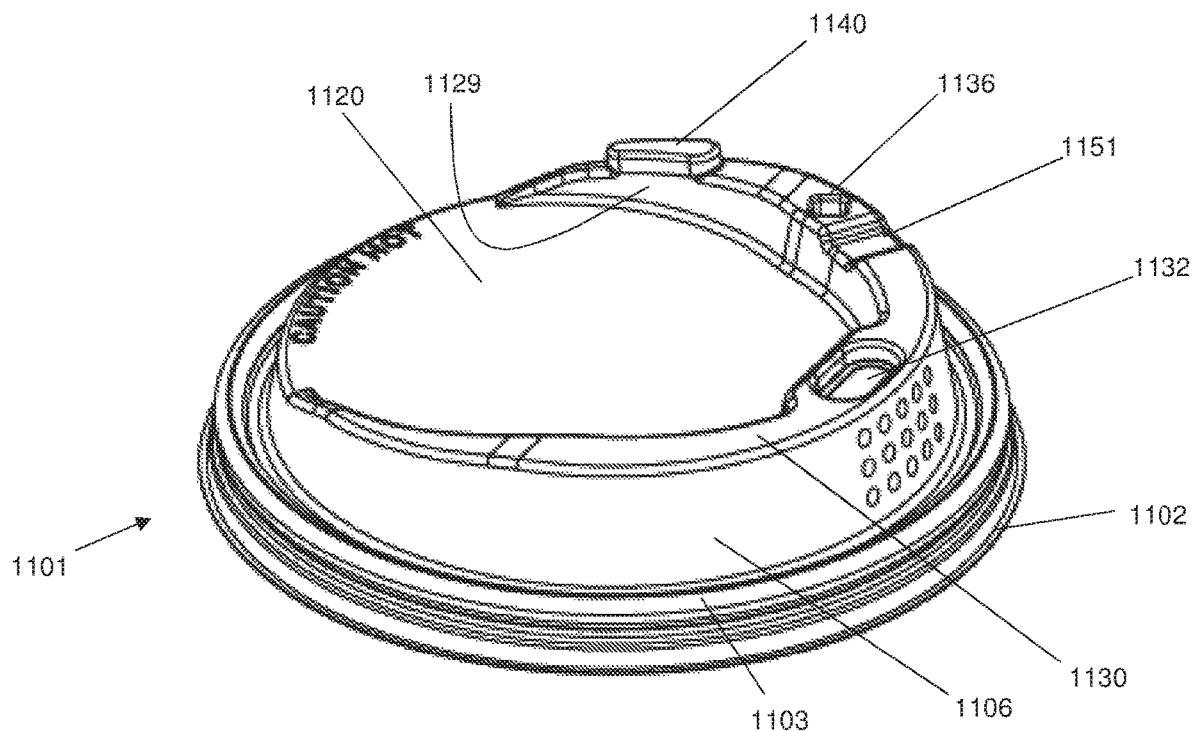
FIG. 15A is a perspective view of an alternate embodiment of a two-piece lid utilizing a folding arm.
Figure 15B:
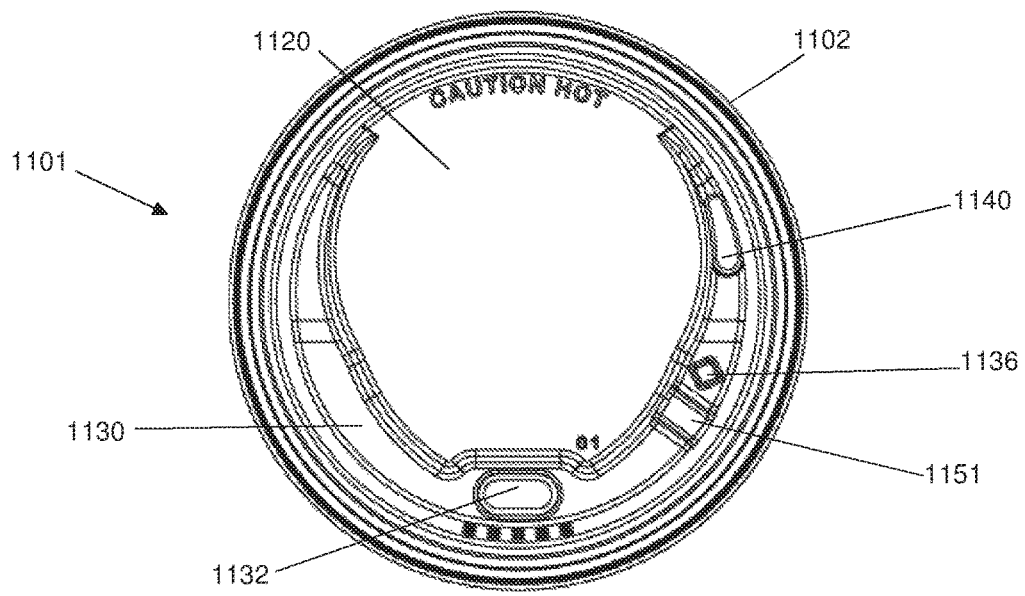
FIG. 15B is a top view further illustrating the embodiment shown in FIG. 15A.

Referring now to FIGS. 15 and 16, a two-part recloseable lid assembly is made up of lid-portion 1101 and arm 1160.

In an exemplary embodiment, lid portion 1101, is manufactured with thin flexible plastic by conventional thermoforming. Lid portion 1101 is adapted for mounting and attaching to a container (not shown), such as a disposable cup. An outer edge 1102 surrounds channel 1103 which is adapted for mounting to a container. Channel 1103 is defined by interior and exterior walls with a ceiling and is adapted to receive and retain a rim of a container, such as a cup. When attached, channel 1103 grips the rim of the container, holding lid portion 1101 in place, creating a seal which resists the spillage of the container contents.

Lid portion 1101 is further comprised of an upwardly extending outer wall 1106 with an upper surface 1130 and inner wall 1129, extending down to and bounding central platform 1120. As with previously described embodiments, upper surface 1130 is proximate to outer edge 1102 in that it is sufficiently close to outer edge 1102 to allow convenient drinking through drink opening 1132 and positioned such that the average distance between outer wall 1106 and the perimeter of outer edge 1102 is less than the average distance between outer wall 1106 and the geometric center of the shape defined by outer edge 1102. It is understood that the "average distance between" outer wall 1106 and outer edge 1102 may be calculated by selecting a number of evenly-spaced points on outer wall 1106 at the same elevation, measuring the distance between those points and the closest corresponding point on outer edge 1102 and averaging the measurements. Similarly, calculating the average distance between outer wall 1106 and a center point can be done by selecting a number of evenly-spaced points on outer wall 1106 at the same elevation, calculating the distance between each of those points and the center point and averaging the resulting measurements. It is thus understood that upper surface 1130 is proximate to outer edge 1102 both in that it provides a convenient location for drink opening 1132 and in that its outer boundary is defined by outer wall 1106 which is closer to outer edge 1102 than it is to the center point of the lid.

As is seen in the figures, upper surface 1130 need not extend around the entire perimeter of lid portion 1101 or be maintained at a constant height. In the illustrated embodiment, upper surface 1130 has its highest elevation in the front of lid portion 1101 and, at a convenient location, begins sloping downward to lower central platform 1120, toward the rear of lid portion 1101. As illustrated, while lower central platform 1120 is bounded by inner wall 1129 and upper surface 1130, it is not completely surrounded by it, as was illustrated in connection with some previously described embodiments.

At the front of lid portion 1101, in upper surface 1130, is a drink opening 1132. In a preferred embodiment, the drink opening 1132 may be an elongated oval shape through which liquid can flow. The shape of drink opening 1132 is adapted so that the mating with the arm plug 1165 (described below) is such that the interface between the arm plug 1165 and drink opening 1132 discourages the leaking or passing of liquid. Drink opening 1132 may be directly in upper surface 1130 or in a recessed area as illustrated and as described in connection with previously described embodiments.

Restraining plug 1140 is adapted to be positioned on upper surface 1130, and restraining plug 1140 is adapted to accept and retain arm plug 1165. In this way, arm plug 1165 can plug drink opening 1132 when arm 1160 is unfolded, and restraining plug 1140 can restrain arm 1160 in the folded position by engaging the back of arm plug 1165 when arm 1160 is folded to allow the user to drink. Restraining plug 1140 need not, however, be of the same shape as arm plug 1165. As illustrated upper surface 1130 narrows as it approaches the back of lid portion 1101. In part due to that narrowing, restraining plug 1140, as illustrated, is of an irregular shape and is narrower than arm plug 1165 on at least one end. As will be readily appreciated by those of skill in the art, however, the difference in shapes does not prevent restraining plug 1140 from mating with and restraining arm plug 1165. A wide variety of shapes may, in fact, be used for restraining plug 1140, provided that restraining plug 1140 is adapted to mate with and restrain arm plug 1165.

Mounting recess 1136, also conveniently on upper surface 1130, is illustrated between drink opening 1132 and restraining plug 1140 and is adapted to receive post 1168 (described below). As has been discussed in connection with other embodiments, post 1168 and mounting recess 1136 may be configured to snap together with an interference fit. As illustrated, however, mounting recess 1136 merely receives post 1168. Post 1168 and mounting recess 1136 may then be coined together during manufacture to discourage arm 1160 from lifting off or separating from lid portion 1101. A coining process will typically include quickly compressing post 1168 and mounting recess 1136 after post 1168 has been received into recess 1136. The resulting deformation serves to restrain post 1168 in mounting recess 1136 after coining and allows for a looser manufacturing tolerance that might otherwise be needed in an embodiment where an equivalent of post 1168 were to snap into an equivalent of mounting recess 1136.

As has been previously described, other attachment means are also possible including, without limitation placing a post (not illustrated) on upper surface 1130 and a mounting recess (not illustrated) on arm 1160 and either snapping or coining them together during manufacture. Adhesives could also be used, as could a tab and slot configuration (not illustrated, but understood in the art), or configurations with holes instead of recesses (also not illustrated), or configurations having a plurality of smaller posts and recesses or holes (also not illustrated). The embodiment illustrated, however, may be preferred for some uses as it allows looser tolerances than snapping and tab and slot configurations, avoids complications of adhesives or welding, allows for fast manufacture and assembly, and tends to result in the deformation resulting from coining being less visible form the top of lid portion 1101 when lid portion 1101 is attached to a cup. Even so, many other attachment means and methods (including those referenced above) will be apparent to those in the art in light of this disclosure.

As with the previously described embodiments, arm 1160 is adapted to be assembled to lid portion 1101 at a location proximate to outer edge 1102. The location is proximate to outer edge 1102 in that the distance between the center of the mounting point of arm 1160 (e.g. the center of mounting recess 1136 described below) and the closest point on the perimeter of outer edge 1102 is less than the distance between the center of the mounting point of arm 1160 and the geometric center of the shape defined by outer edge 1102.

Figure 16A:
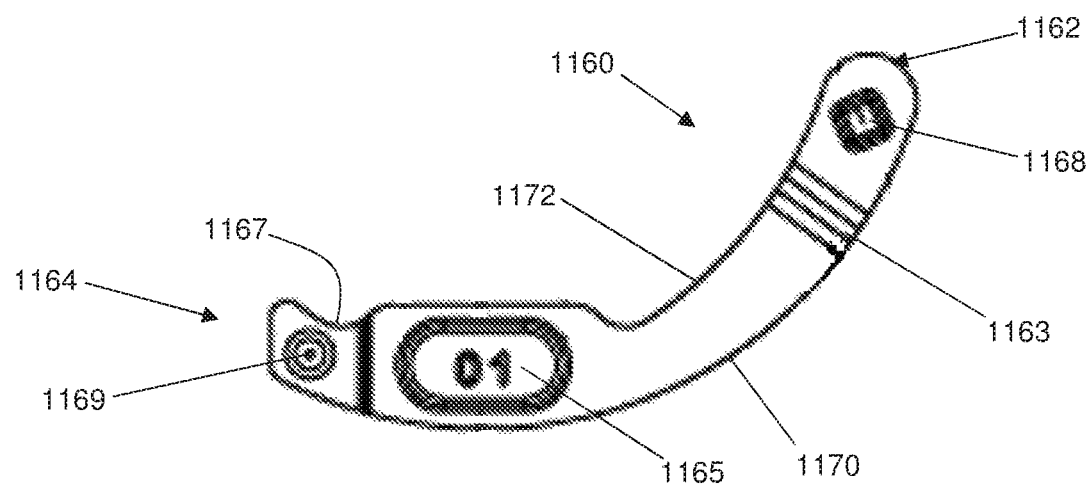
FIG. 16A is a perspective view of an alternate arm embodiment suitable for use with the lid portion illustrated in FIG. 15A.
Figure 16B:
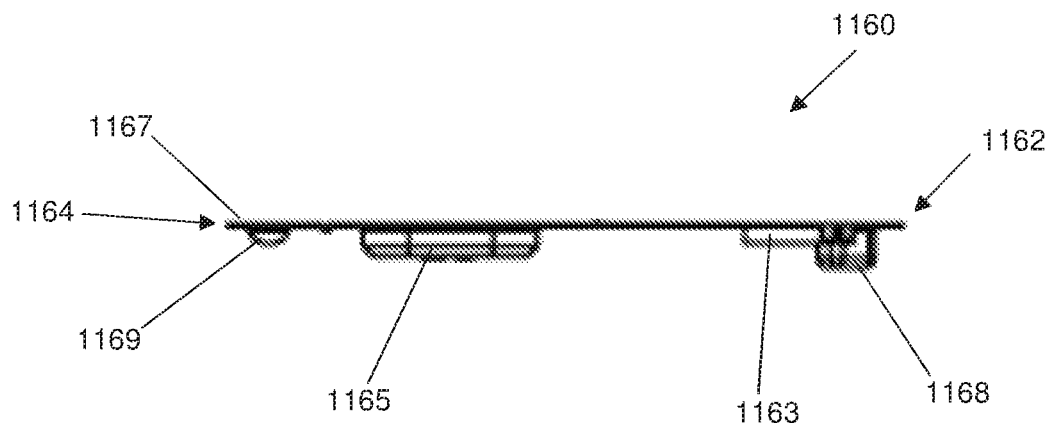
FIG. 16B is a side view of the arm embodiment shown in FIG. 16A.

Arm 1160 is illustrated in a top view in FIG. 16A and a side view in FIG. 16B, and is adapted to fold back when not plugging drink hole 1132. Arm 1160 may conveniently be a thin piece of thermoformed plastic with arm mounting end 1162 and an arm plug end 1164. As illustrated in this embodiment, arm 1160 is curved with outer arm edge 1170 and inner arm edge 1172 having curvature that approximately matches that of outer wall 1106 and inner wall 1129 respectively. Arm plug end 1164 comprises tab 1167 to facilitate grasping and lifting arm plug end 1164. While illustrated as extending as part of a continuous curve, it will be understood that in other embodiments tab 1167 could extend to either side instead. Dimple 1169 on tab 1167 may conveniently be used to raise arm plug end 1164 slightly above upper surface 1130 when in the closed position to make tab 1167 easier to grasp. Score lines, notches, a thinned area or other means understood in the art may be used to define the location where tab 1167 begins its upward slope. As illustrated, arm 1160 is curved to substantially match the curve of upper surface 1130, but could also be straight or have a different curvature if so desired.

Arm mounting end 1162 comprises a downwardly facing post 1168 adapted to be received by mounting recess 1136. As illustrated, post 1168 and mounting recess 1136 are adapted to be coined together during assembly, but other attachment methods may also be used, as is discussed above. While post 1168 is rectangular as illustrated, shape of post 1168 may be of a variety of shapes provided that arm 1160 is intended to fold and need not pivot rotationally.

Arm plug end 1164 comprises an arm plug 1165 adapted to be received and retained by drink opening 1132. The arm 1160, when mounted, creates a two position configuration, with the first arm position describing a position where the arm is unfolded and arm plug 1165 is mated with and plugging the drink opening 1132. The second arm position describes a folded position where the other side of arm plug 1165 is mated with and secured by restraining plug 1140.

As has been discussed in connection with prior-described embodiments, folding may be facilitated in a variety of ways, including by incorporating a flat section (not illustrated) adapted to allow folding at an appropriate location or by a score line (also not illustrated) adapted to allow the fold to occur at the correct location. Other variations are also possible, including one or more notches or areas of narrower width and other means commonly used in the thermoplastics industry to encourage folding at a particular location.

As illustrated, arm 1160 comprises a convex section 1163 to encourage folding at an optimal location. Where convex section 1163 is used, valley 1151 may conveniently be added to upper surface 1130 to receive convex section 1163 when arm 1160 is in an unfolded first position.

Figure 17A:
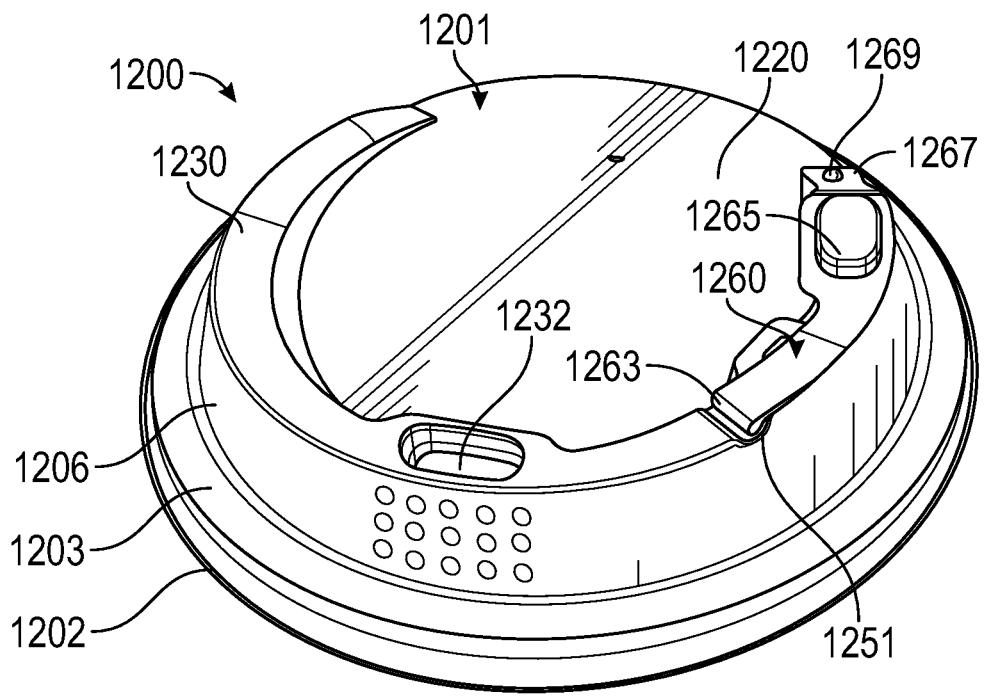
FIG. 17A is a perspective rendering of an alternate embodiment of a two-piece lid utilizing a folding arm with the arm folded.
Figure 17B:
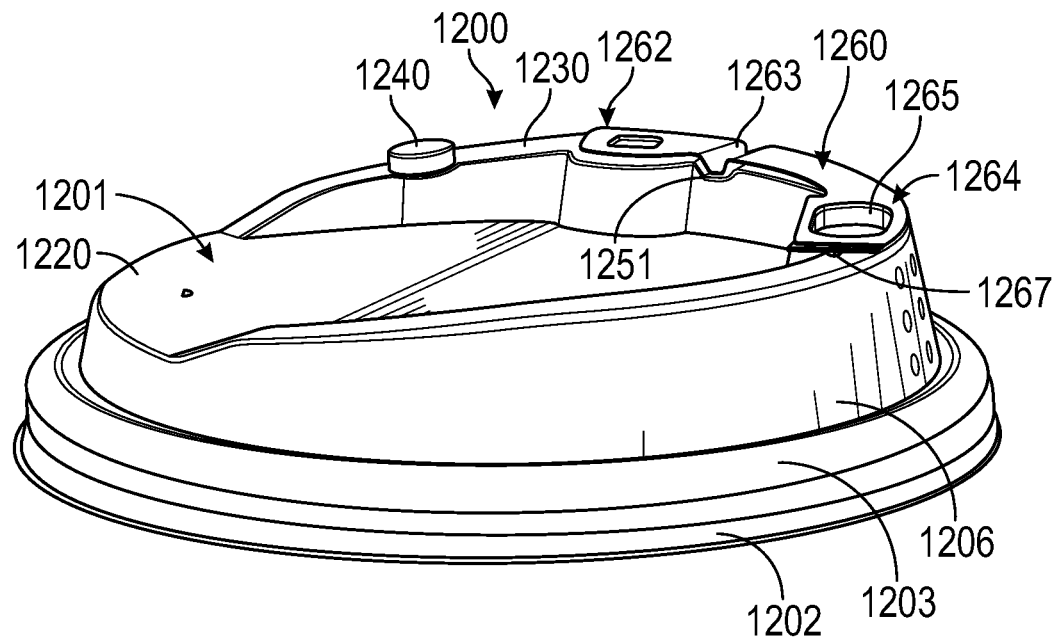
FIG. 17B is a perspective view of the embodiment shown in FIG. 17A with the arm unfolded rm.
Figure 18:
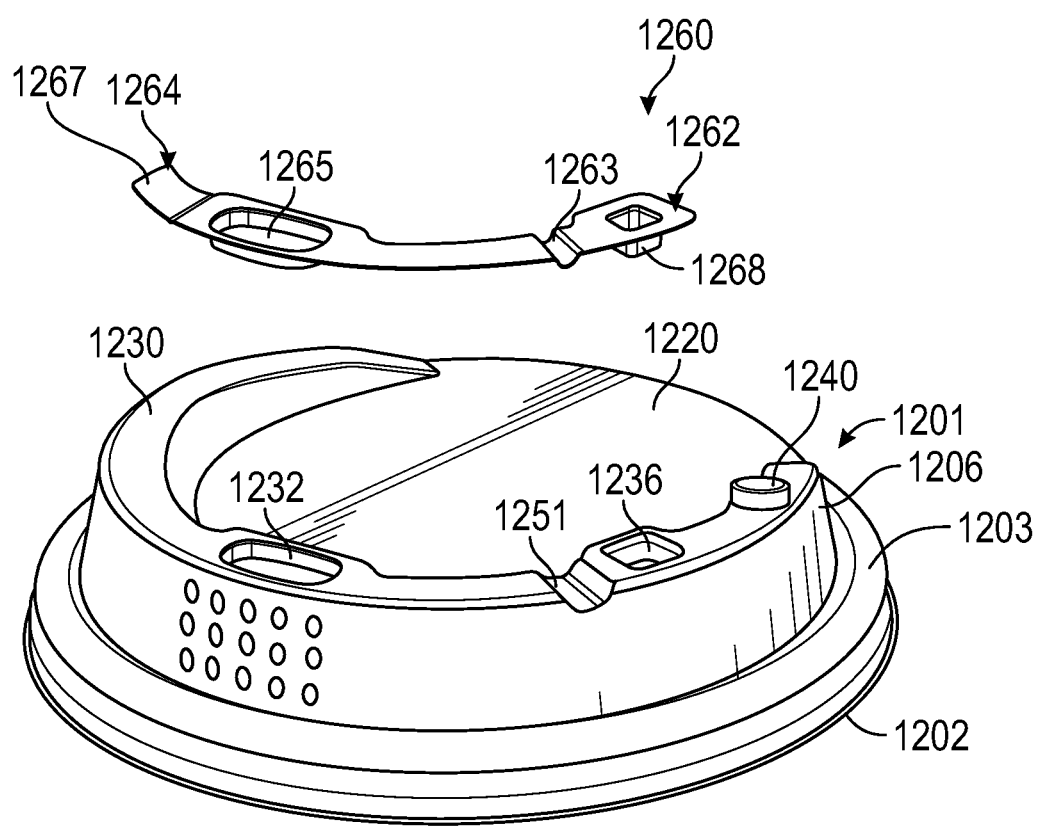
FIG. 18 is an exploded, perspective rendering of the two-piece lid embodiment illustrated in FIG. 17.

As will be understood by those of skill in the art in light of the foregoing disclosure, a variety of arm/lid configurations and arm attachment means are possible, all within the scope of the present invention. FIGS. 17 and 18 illustrate one such configuration as embodied in two-part recloseable lid 1200. FIGS. 17 and 18 describe another embodiment of two-part recloseable lid 1200. Referring to FIGS. 17 and 18, for example, lid portion 1201 and arm 1260 are shown, which is highly similar to lid portion 1101 and arm 1160 previously described, with outer edge 1202, channel 1203, outer wall 1206, upper surface 1230, drink opening 1232, optional valley 1251, and restraining plug 1240. Arm 1260 likewise has convex area 1265 to promote folding, tab 1267 with dimple 1269 to ease lifting, and post 1268 on arm mounting end 1262 to facilitate securing arm 1260 to lid portion 1201 by coining or interference fit. In that embodiment, however, restraining plug 1240 is round instead of oblong. Arm plug 1265 thus has a different shape and volume than restraining plug 1240. Volume of arm plug 1265 can be understood to be the volume of the cavity on arm plug 1265 that is adapted to receive restraining plug 1240. Similarly, the volume of restraining plug 1240 can be understood to be the volume of the portion of the cavity on arm plug 1265 that is filled by restraining plug 1240, when restraining arm 1260. Stated differently, restraining plug 1240 can be the same size and shape as the cavity on arm plug 1265, or smaller, provided that there is an interference fit between them when engaged.

Restraining plug 1240 is also positioned such that tab 1267 extends over a downwardly sloping section of upper surface 1230 when arm 1260 is in a folded second position. The illustrated arrangement provides a neat appearance where the bend in tab 1267 matches the slope of the rear section of upper surface 1230, and could also facilitate grasping of tab 1267 were the slope of the rear section of upper surface 1230 greater than the bend of tab 1267. As illustrated, however, such a feature is not needed as the width of arm plug end 1264 is such that a portion extends past restraining plug 1240 and over the edge of upper surface 1230 to facilitate grasping. As will be understood by those in the art in light of this disclosure, other arrangements are also possible, such as, without limitation, terminating the upper surface closer to the front of lid portion 1201, placing a restraining plug (not illustrated) on lower central platform 1220 and possibly arranging tab 1267 to extend over the edge of lower central platform 1220. The illustrated embodiment provides only one example.

Other variations and embodiments of the present invention will be apparent to those of ordinary skill in the art in light of this specification, all of which are within the scope of the present invention. Nothing in the foregoing description is intended to imply that the present invention is limited to the preferred embodiments described herein.

What is claimed is:

1. A disposable cup lid comprising:
   an outer edge;
   a drink opening proximate to said outer edge;
   a restraining plug proximate to said outer edge;
   a mounting recess proximate to said outer edge; and
   an arm attached to said mounting recess and comprising an arm plug, a folding section, and a post;
   said post being coined to said mounting recess; and
   said arm plug configured to engage said drink opening when said arm is in an unfolded first position, and to engage said restraining plug when said arm is in a second position;
   whereby said arm plug may substantially seal said drink opening when said arm is in said first position and said arm plug may engage said retraining ping to retain said arm and allow drinking through said drink opening when said arm is in said second position.

2. A disposable cup lid according to claim 1 wherein said arm further comprises a lifting tab.

3. A disposable cup lid according to claim 1 wherein said restraining plug and said arm plug are of substantially the same shape and volume.

4. A disposable cup lid according to claim 1 wherein the volume of said restraining plug is less than the volume of said arm plug.

5. A disposable cup lid comprising:
   an outer edge;
   a think opening proximate to said outer edge;
   an upwardly projecting post proximate to said outer edge; and
   a moveable arm proximate to said outer edge and comprising an arm plug and an arm recess adapted to receive said post;
   said arm plug configured to engage said drink opening when said arm is in a first position;
   whereby said arm is coined to said lid; and
   whereby said arm plug may substantially seal said drink opening when said arm is in said first position and said arm plug is engaged, and allow drinking through said drink opening when said arm plug is in a second position and said arm plug is not engaged.

6. A disposable cup lid according to claim 5 further comprising a restraining plug adapted to receive said arm plug when said arm is in said second position.

7. A disposable cup lid according to claim 5 wherein said arm is adapted to fold from said first position to said second position.

8. A disposable cup lid comprising:
- an outer edge and a restraining plug;
- a mounting means proximate to said outer edge; and
- an arm rotatably attached to said mounting means and comprising an arm plug;
- said arm plug configured to engage a drink opening when said arm is in a first position, and to engage said restraining plug when said arm is in a second position;

said mounting means forming an interference fit;

whereby said arm plug may substantially seal said drink opening when said arm is in said first position and said arm plug may engage said restraining plug to retain said arm and allow drinking through said drink opening when said arm is rotated to said second position.

* * * * *